United States Patent Office 3,161,654
Patented Dec. 15, 1964

3,161,654
α-(1-AROYL-3-INDOLYL) ALKANOIC ACIDS
Tsung-Ying Shen, Westfield, N.J., assignor to Merck & Co., Inc., Rahway, N.J., a corporation of New Jersey
No Drawing. Filed June 11, 1963, Ser. No. 286,935
14 Claims. (Cl. 260—319)

This invention relates to new chemical compounds. More particularly, it relates to a new class of compounds of the indole series. Still more particularly, it is concerned with new α-(3-indolyl)-lower aliphatic acids having an aromatic carboxylic acyl radical of less than three fused rings attached to the nitrogen atom of the indole ring. It is concerned further with salts, esters and amide derivatives of such compounds. It relates also to the synthesis of such substances.

The new aroyl and heteroaroyl indolyl aliphatic acid compounds of this invention have the general structural formula:

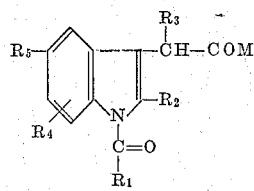

in which $R_1$ may be a benzene, naphthalene, biphenyl or a substituted benzene, naphthalene or biphenyl radical in which the substitutents may be halogen, lower alkyl, lower alkylthio, lower alkoxy, trifluoromethyl, phenoxy, lower alkylphenoxy, lower alkoxy phenoxy, halogenophenoxy, trifluoroacetyl, difluoroacetyl, monofluoroacetyl, di(lower alkyl)sulfamyl, lower alkanoyl, di-lower alkyl)carboxamido, cyano, carb-lower alkoxy, aldehyde, trifluoromethylthio, lower alkylsulfinyl, lower alkyl sulfonyl, benzylthio, lower alkylbenzylthio, lower alkoxybenzylthio, halogenobenzylthio, mercapto, nitro, amino, di(lower alkyl) amino, lower alkylamino, lower alkanoylamino, hydroxy, lower alkanoyloxy, trifluoroacetoxy, difluoroacetoxy, monofluoroacetoxy, benzyloxy, lower alkylbenzyloxy, lower alkoxybenzyloxy and halogenobenzyloxy;

$R_2$ may be hydrogen, lower alkenyl or lower alkyl;
$R_3$ may be hydrogen or lower alkyl;
$R_4$ may be hydrogen, lower alkoxy, fluorine, lower alkyl or trifluoromethyl;
$R_5$ may be hydrogen, lower alkyl, lower alkoxy, nitro, amino, lower alkylamino, di(lower alkyl)amino, lower alkanoylamino, lower alkanoyl, lower alkylamino, bis-(hydroxy lower alkyl)amino, 1-pyrrolidino, 4-methyl-1-piperizinyl, 4-morpholinyl, cyano, amino lower alkyl, di(lower alkyl)amino lower alkyl, trifluoromethyl, halogen, di(lower alkyl)sulfamyl, benzylthio, lower alkylbenzylthio, lower alkoxy benzylthio, halogenobenzylthio, benzyloxy, lower alkylbenzyloxy, lower alkoxybenzyloxy, halogenobenzyloxy, lower alkenyl, lower alkenyloxy, 1-aza-cyclopropyl, cyclopropylmethyloxy or cyclobutylmethyloxy; and
M may be OH, NH$_2$, lower alkoxy, benzyloxy, OZ where Z is a cation or OY where Y is the structure:

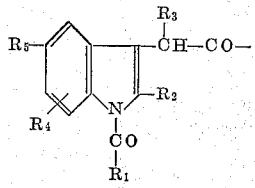

In the most preferred compounds of the invention, $R_5$ is a lower alkyl, lower alkoxy, nitro, amino, or substituted amino. Examples of the alkyl and alkoxys are methyl, ethyl, propyl, t-butyl, methoxy, ethoxy, i-propoxy and the like. $R_5$ is not limited to this class of substituents, however, and may, if desired, represent substituents such as hydrogen, aryl, aryloxy, hydroxy, mercapto, halo, pseudohalo such as $CF_3$, $CHF_2$ or other haloalkyls, nitro, amino, alkylamino, acylamino, haloalkyl, cyano, sulfamyl, sulfoxide, aminomethyl, substituted aminomethyl, carboxy, carboalkoxy groups.

A critical feature of the new compounds described herein is the presence of an aroyl radical attached to the N–1 position of the indole. These acyl groups may be further substituted in the aromatic ring with hydrocarbon groups or with functional substituents. Thus, suitable aroyl substituents are the benzoyl, phenylbenzoyl and napthoyl groups. The aromatic rings of such groups may contain, and in the preferred compounds do contain, at least one functional substituent. This substituent may be a hydroxy or an etherified hydroxy (hydrocarbonoxy) group such as a lower alkoxy, e.g., methoxy, ethoxy, isopropoxy, propoxy, an alkenyloxy such as allyloxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and arylthio or aralkylthio groups, e.g., benzylthio and phenylthio. The N–1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the N–1 aroyl radical is benzoyl and the functional substituent is in the para position of the six-membered ring.

The α-(3-indolyl)-aliphatic acids described herein are preferably lower aliphatic acids such as α-(3-indolyl) derivatives of acetic, propionic, butyric, valeric and like acids. Lower alkyl esters, salts and the amides of such aliphatic acids represent an additional aspect of the invention. The esters are important intermediates in the synthesis of the free acids, and in many cases are themselves of importance as end products. The preferred esters are the lower alkyl esters such as the methyl, ethyl, propyl or t-butyl compounds and the benzyl, p-halobenzyl and like esters.

The salts of these new α-(1-aroyl or heteroaroyl-3-indolyl)-lower aliphatic acids can be obtained by treatment of the free acid with base under mild conditions. In this manner there may be obtained alkaline metal salts such as the sodium and potassium, the aluminum or magnesium salts or salts of alkaline earth metals, examples of which are barium and calcium. Salts of organic amines such as dimethylamine, morpholine, methyl cyclohexylamine or glucosamine may be obtained by reacting the acid with the appropriate organic base. The amides included within this invention are conveniently synthesized by first preparing the amide of an α-(3-indolyl)-lower aliphatic acid unsubstituted at the 1-position and then acylating said compound by the process described hereinbelow. Such amides are conveniently obtained by reacting the free acid with urea or treating the appropriate acid chloride with ammonia.

The 2-position of the indole ring nucleus ($R_2$ in the above formula) may be hydrogen although it is preferred that there be present at this position of the molecule a hydrocarbon radical having less than nine carbon atoms. Lower alkyl groups such as methyl, ethyl, propoyl or butyl are the most satisfactory, but lower alkenyl radicals also can be used.

The following compounds are representative of those contemplated by this invention and which may be prepared by the procedure discussed hereinbelow:

Methyl-α-(1-p-chlorobenzoyl-2-methyl-5 - methoxy - 3-indolyl)-acetate,
methyl-α-(1-p-chlorobenzoyl-2,5-dimethyl - 3 - indolyl)-acetate,
methyl-α-(1-p-methylthiobenzoyl-2-methyl-5-methoxy - 3-indolyl)-acetate,
α-(1-p-chlorobenzoyl-2-methyl-5-methoxy - 3 - indolyl)-propionic acid,
α-(1-p-chlorobenozyl-2-methyl-5-methoxy - 3 - indolyl)-acetamide,
α-(1-benzoyl-2-methyl-5-methoxy-3-indolyl)-acetamide,
ethyl-α-[1-(2,4-dichlorobenzoyl)-2-methyl - 5 - methoxy-3-indolyl]-propionate,
benzyl-α-[1-(naphthoyl)-2-methyl-5-methoxy-3 - indolyl]-acetate, and the like.

The α-(1-aroyl or heteroaroyl-3-indolyl)-lower aliphatic acids and derivatives thereof described herein are synthesized by acylation of the α-(3-indolyl)-lower aliphatic acid, ester or amide having the desired substituents at the 2- and 5-positions of the ring nucleus. It is preferred to carry out the acylation on an ester or amide derivative of the lower aliphatic acid. In those cases where the free acid is desired, the ester may be converted under suitable reaction conditions to the free acid. It has been observed that the 1-aroyl or heteroaroyl substituent is easily hydrolyzed under conditions normally employed for saponification of an ester to the free acid. For this reason, care must be taken in converting the α-(1-aroyl or heteroaroyl-3-indolyl)-lower aliphatic acid esters to the corresponding free acids. It has been found that one convenient method of accomplishing this conversion comprises acylation of the benzyl ester and subsequent hydrogenolytic removal of the benzyl ester. Alternatively, other esters such as the t-butyl esters, which are amenable to selective removal by other treatment, such as heating above 210° C. or by heating at 25–110° C. in the presence of a catalytic amount of an aryl sulfonic acid or other acids may be utilized. When, instead of an ester, the amides of these acids are prepared, the free acids are formed by reaction of the amides with a stoichiometric quantity of nitrous acid in an inert solvent.

The acylation reaction is preferably conducted by treating the α-(3-indolyl)-lower aliphatic acid starting material with an alkali metal hydride such as soduim hydride to form e.g., a sodium salt and then intimately contacting said salt with an aroyl or heteroaroyl acid halide in an anhydrous solvent medium. It is preferred to employ solvents such as dimethyl-formamide, dimethylformamide-benzene, benzene, toluene or xylene. It is preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenyl ester. This latter is prepared by mixing the acid and p-nitrophenol in tetrahydrofuran and adding dicyclohexyl carbodiimide in tetrahydrofurane slowly. The dicyclohexylurea which forms is removed by filtration and the nitrophenylester is recovered from the filtrate. Alternatively, there can also be used the anhydride, azide or thiophenolic ester of the acylating acid. Whichever is used, the acylation of the α-(3-indolyl)-lower aliphatic acid starting material is achieved by forming a sodium salt of said material with sodium hydride in an anhydrous solvent and adding the nitrophenylester.

The α-(1-aroyl or heteroaroyl-3-indolyl)-lower aliphatic acid compounds of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–2000 mg. per day are useful in control of arthritic conditions, depending on the activity of the specific compound and the reaction sensitivity of the patient.

The indolyl aliphatic acid compounds employed as starting material in the reaction discussed above, and having the formula:

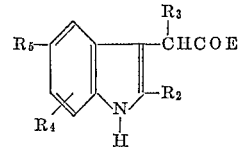

where $R_2$, $R_3$, $R_4$ and $R_5$ have the previously defined meanings and E is a hydrocarbonoxy radical having less than nine carbon atoms or —$NH_2$, may be synthesized in various ways. When $R_2$ is hydrogen or methyl, it is preferred to form such compounds by reacting together an appropriately substituted phenylhydrazine and a substituted levulinic ester or amide to form an intermediate phenylhydrazone which cyclizes under the reaction conditions to the indole compound

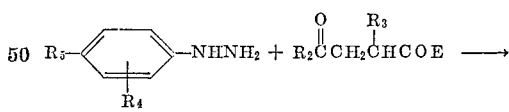

where $R_3$, $R_4$ and $R_5$ and E are as above, and $R_2$ is hydrogen or methyl. The reaction is normally carried out in a lower alkanol such as methanol, ethanol, isopropanol or butanol containing an acid such as hydrochloric, hydrobromic, sulfuric or acetic acid or in aqueous mineral acid such as concentrated hydrochloric, hydrobromic, sulfuric or acetic acid, or other Lewis acids such as $ZnCl_2$, $BF_3$, $SnCl_4$ and the like. The acid serves as a catalyst in the condensation and ring closure reactions leading to the 1-unsubstituted indole. When the substituted levulinic esters are used, the nature of the ester is not critical, although it is preferred to utilize a lower alkyl ester, e.g., the methyl, ethyl, propyl, isobutyl or isopropyl compound. To avoid the possibility of transesterification the alcohol used as the solvent medium is preferably the same as the alcohol moiety of the ester. When $R_2$ is hydrogen, it is convenient to employ the aldehyde in the form of an acetal, e.g., methyl γ,γ-dimethoxy butyrate. An acid addition salt of the phenylhydrazine reactant, for example the hydrochloride, is normally preferred over the free base for practical reasons, although such salts and the base are equivalent in the reaction itself.

Formation of the α-(3-indolyl)-aliphatic acid, or ester thereof, is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the 1-unsubstituted esters are low melting solids, they are conveniently purified by distillation under reduced pressure. They are saponified by treatment with an alkali metal hydroxide.

The substituted phenylhydrazines employed as one of the starting materials in this synthesis are prepared by known methods. One convenient method is by diazotization of the appropriately substituted aniline to give the diazo compound, treatment of the latter with stannous chloride to form a tin complex, and decomposition of this complex, to the phenylhydrazine with sodium hydroxide.

The 1-acyl group in α-(1-acyl-3-indolyl) aliphatic acids and esters of this invention are, as has been mentioned earlier, easily hydrolyzed under the conditions normally used to saponify an ester. For this reason, the benzyl ester of the intermediate α-(1-unsubstituted-3-indolyl) acids are a convenient starting material. These are obtained by forming the free α-(1-unsubstituted-3-indolyl) aliphatic acid and esterifying this with benzyl alcohol in an inert solvent with an acid catalyst (sulfuric, aryl sulfonic acids, etc.). Alternatively, the intermediate benzyl ester is synthesized directly by using the benzyl ester of the proper levulinic acid in the original synthesis of the indole ring, or is formed by base catalyzed ester exchange from other esters. After acylation of the indole nitrogen of these benzyl ester intermediates, the benzyl group can be removed clearly by hydrogenolysis, a process which leaves the 1-acyl group untouched.

Alternatively, it is possible first to produce an indole of the formula:

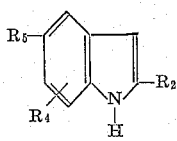

where $R_2$, $R_4$ and $R_5$ have the same meaning as before, and then to introduce the carboxylic acid residue at the 3-position. This is accomplished by treating the indole of the above formula under Mannich reaction conditions with formaldehydedialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure shown above, it is particularly useful for making compounds of this invention wherein $R_2$ is an alkyl radical other than methyl, such as the 2-ethyl, 2-propyl, 2-allyl and the like substances. Compounds of the above formula, unsubstituted in the 3-position, are readily prepared following the procedures set forth in columns 2 and 3 of the U.S. Patent No. 2,825,734 Products where $R_5$ is acyloxy, halo, cyano, carboxy, carbalkoxy, alkyl, aryl, aralkyl, nitro or hydrocarbonoxy are prepared via the synthesis beginning from a substituted 2-nitro benzaldehyde or 2-nitrotoluene.

The synthesis of various compounds of this invention having on the indole ring system a 5-substituent which has a nitrogen attached to the homocyclic ring of the indole is generally based on the 5-nitro compound. This is transformed into the desired 5-substituent. Such transformation may be before or after acylation of the 1-position, depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Reduction of the 5-nitro groups gives a 5-amino group. Reaction of the amino with alkyl halides gives mono and dialkyl amino groups. If the alkyl halide is a dihaloalkylene group (e.g., 1,4-dibromobutane) a heterocyclic ring (e.g., pyrrolidino) is formed. Similarly, bis(β-chlorethyl)ether will give an N-morpholino compound. Alkylation can also be carried out simultaneous with reduction, as e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

This application is a continuation-in-part of my application, Serial No. 164,615, filed January 5, 1962, now abandoned, which was a continuation-in-part of my application, Serial No. 97,434, filed March 22, 1961, now abandoned.

EXAMPLE 1

A. Ethyl-α-(2 - Methyl-5-Methoxy-3-Indolyl) - Propionate

A solution of 25 g. of p-methoxyphenylhydrazine hydrochloride and 20 g. of ethyl α-methyl levulinate in 250 ml. of 2 N ethanolic hydrochloride is heated on a steam bath for a few minutes. An exothermic reaction takes place with the separation of ammonium chloride. The reaction flask is removed from the steam bath and the mixture allowed to reflux gently until the initial reaction subsides. The mixture is again heated on a steam bath under reflux for 30 minutes, and then concentrated in vacuo to a volume of about 80 ml. The concentrate is diluted with about 400 ml. of water and extracted with ether. The resulting ethereal extract is washed with a saturated solution of sodium bicarbonate, and with water, and dried over anhydrous sodium sulfate. The dried solution is filtered and evaporated to a dark brown syrup which is purified by chromatography over about 1 lb. of acid-washed alumina in a 2¼″ I.D. column using mixtures of ether and petroleum ether (v./v. 1:9 to 1:1) as eluent. The light yellow syrup so obtained is distilled in a short-path distillation apparatus and the product collected at B.P. 150–153° C. (0.25 mm.). The distillate of ethyl-α-(2-methyl-5-methoxy-3-indolyl)-propionate crystallizes on trituration with petroleum ether, M.P. 53–55.5° C. On recrystallization from a mixture of ether and petroleum ether the melting point is unchanged.

Calcd. for $C_{15}H_{19}O_3N$: C, 68.94; H, 7.33; N, 5.36. Found: C, 69.23; H, 7.31; N, 5.60.

When the methyl, propyl, isopropyl or benzyl ester of α-methyl levulinic acid is employed in the above reaction in place of the ethyl ester, there is obtained methyl-α-(2-methyl-5-methoxy-3-indolyl) - propionate, propyl - α-(2-methyl-5-methoxy-3-indolyl) - propionate, isopropyl-α-(2-methyl-5-methoxy-3-indolyl)-propionate, or benzyl-α-(2-methyl-5-methoxy - 3 - indolyl) - propionete, respectively. Alternatively, when an ester of levulinic acid is used as starting material in the above process, the corresponding ester of α-(2-methyl-5-methoxy-3-indolyl)-acetic acid is obtained.

B. Ethyl-α-(2,5-Dimethyl-3-Indolyl)-Propionate 20 g. of p-methylphenylhydrazine hydrochloride and 20 g. of ethyl α-methyl levulinate are added to 250 ml. of 2 N ethanolic hydrogen chloride and the mixture warmed until reaction sets in. After the initial exothermic reaction stops, the mixture is refluxed for about ½ hour and then concentrated in vacuo to about ⅓ volume. 400 ml. of water are added and the aqueous solution extracted with ether. The ether extracts are washed with sodium bicarbonate solution, and with water, then dried over sodium sulfate. The ether solution is concentrated to a small volume in vacuo and chromatographed over acid-washed alumina (1 lb. of alumina in a 2¼" I.D. column). The material eluted with ether-petroleum ether (v./v. 9:1 to 1:1) is distilled in a short-path distillation apparatus. Ethyl - α-(2,5-dimethyl-3-indolyl)-propionate distills at 150–170° (bath temp.)/1 mm., and crystallizes on trituration with petroleum ether, M.P. 88–88.5° C.

When a lower alkyl or benzyl levulinate is employed in place of ethyl α-methyl levulinate, lower alkyl- or benzyl-(2,5-dimethyl-3-indolyl)-acetate is produced.

EXAMPLE 2

*Ethyl-α-(1-p-Methylthiobenzoyl-2-Methyl-5-Methoxy-3-Indolyl)-Propionate*

A suspension of 2.3 g. (0.046 m.) of 50% sodium hydride-mineral oil in 250 ml. of dimethylformamide is stirred for 20 minutes under nitrogen with ice-cooling. Then 8.64 g. (0.035 m.) of ethyl-α-(2-methyl-5-methoxy-3-indolyl)-propionate is added and the mixture stirred for 20 minutes. 8.6 g. (0.046 m.) of p-methylthiobenzoyl chloride in 50 ml. of dimethylformamide is added dropwise over a period of 30 minutes. The mixture is stirred in an ice-bath for 5 hours under nitrogen. It is then poured into a mixture of 500 ml. of ether, 5 ml. of ecetic acid and 1 l. of iced water. The organic products are extracted with 3 x 300 ml. of ether. The ether solutions are combined and washed with a large quantity of water, and dried over sodium sulfate. The solution is filtered, evaporated to near dryness and the residue charged onto a 300 g. alumina column. The ethyl-α-(1-p-methylthiobenzoyl-2-methyl-5-methoxy-3 - idolyl) - propionate is eluted with 10% ether in petroleum ether. It is obtained as a yellow oil on concentration of the eluates to dryness.

The p-methylthiobenzoyl chloride starting material is obtained by heating a mixture of 27 g. (0.15 m.) of p-methylthiobenzoic acid and 21.4 g. (0.18 m.) of thionyl chloride on a steam bath for 1 hour. About 20 ml. of benzene is then added and boiled off. The remaining solution is centrifuged and diluted with petroleum ether. On cooling, the acid chloride separates, M.P. 40–44° C.

When methyl-(2-methyl-5-methoxy-3-indolyl)-acetate is employed as the starting material in the above process, there is obtained methyl-(1-p-methylthiobenzoyl-2-methyl-5-methoxy-3-indolyl)-acetate.

EXAMPLE 3

*Methyl-α-(1-p-Chlorobenzoyl-2-Methyl-5-Methoxy-3-Indolyl)-Acetate*

To 3.9 g. (0.078 m.) of 51% sodium hydride-mineral oil suspended in 150 ml. of distilled dimethylformamide, in a 1 liter 3-neck flask, is added with stirring at 0° C. 9.5 g. (0.040 m.) of methyl-(2-methyl-5-methoxy-3-indolyl)-acetate in 150 ml. of dimethylformamide. The mixture is allowed to stir for 1 hour and then 9.1 g. (0.052 m.) of p-chlorobenzoyl chloride in 50 ml. of dimethylformamide is added dropwise over a period of 30 minutes. The reaction mixture is stirred another 30 minutes at 0° C. and then allowed to stand 12 hours in the cold.

The reaction mixture is then filtered and the solids washed with ether. The ether is added to the filtrate which is then washed with water and dried over sodium sulfate. After filtering off the sodium sulfate, approximately 75 g. of acid-washed alumina is added to the ethereal solution and this mixture concentrated to dryness. The indole-coated alumina is then packed on top of a column of 400 g. of alumina. The column is eluted with petroleum ether containing increasing amounts of ethyl ether. Methyl - α - (1-p-chlorobenzoyl-2-methyl-5-methoxy-3-indolyl)-acetate is eluted with 15% ether-petroleum ether. These latter eluates are combined and concentrated to dryness. Recrystallization of the residue from benzene-petroleum ether yields substantially pure methyl - α - (1-p-chlorobenzoyl-2-methyl-5-methoxy-3-indolyl)-acetate, M.P. 99–100° C.

Carrying out the above-noted process with ethyl-α-(2-methyl-5-methoxy-3-indolyl)-propionate or benzyl-α-(2,5-dimethyl-3-indolyl)-propionate yields, respectively, ethyl-α - (1 - p - chlorobenzoyl-2-methyl-5-methoxy-3-indolyl)-propionate and benzyl-α-(1-p-chlorobenzoyl-2,5-dimethyl-3-indolyl)-propionate.

EXAMPLE 4

*Ethyl-α-[1-(o-Methyl-p-Methylthiobenzoyl)-2-Methyl-5-Methoxy-3-Indolyl]-Propionate*

A mixture of 100 ml. of dimethylformamide, 5.2 g. (0.02 m.) of ethyl-α-(2-methyl-5-methoxy-3-indolyl)-propionate and 1.2 g. (0.025 m.) of sodium hydride in mineral oil (50% dispersion) is stirred in an ice-bath under nitrogen for 1 hour. A solution of 4.0 g. (0.02 m.) of 2-methyl-4-methylthiobenzoyl chloride (prepared from the acid, M.P. 159–162° C., and thionyl chloride) and 25 ml. of dimethylformamide is then added during 0.5 hour, and stirring is continued for 16 hours at room temperature. The mixture is poured into 350 ml. of water, extracted with ether, and the ether solution washed with water, dried over magnesium sulfate, filtered and evaporated to dryness under reduced pressure. The residual oil is dissolved in petroleum ether (60–70° C.) and chromatographed on 250 g. of acid-washed alumina. The ethyl-α - [1-(o-methyl-p-methylthiobenzoyl)-2-methyl-5-methoxy-3-indolyl]-propionate is eluted with 15% ether in petroleum ether and isolated as an oil.

I.R. $\lambda_{max.}^{CHCl_3}$ 5.77 (CO), 5.94 (CO), 6.21, 6.73

EXAMPLE 5

*Ethyl-α-(1-Benzoyl-2-Methyl-5-Methoxy-3-Indolyl)-Propionate*

To a solution of 5.22 g. of ethyl-α-(2-methyl-5-methoxy-3-indolyl)-propionate in 20 ml. of dimethylformamide is added a suspension of 1.2 g. of 51% sodium hydride in mineral oil in 40 ml. of dimethylformamide. After 1 hour of stirring at room temperature, a solution of 2.88 ml. of benzoyl chloride in 10 ml. of dimethylformamide is added to initiate a mild exothermic reaction with precipitation of sodium chloride. The reaction mixture is stirred for 6 hours followed by standing overnight. The mixture is poured into about 200 g. of ice and extracted with ether three times. The ethereal solution is washed with water, sodium bicarbonate and dried over potassium carbonate. After filtration the solution is evaporated to a syrup and chromatographed on a column of 100 g. of acid-washed alumina, using mixtures of benzene-petroleum ether (2:1 to 3:1 v./v.) as eluent. A total of 1.06 g. of ethyl-α-(1-benzoyl-2-methyl-5-methoxy-3-indolyl)-propionate is obtained as a thick yellow oil. The infrared spectrum shows no N—H absorption near the 2.8–3μ region but shows strong C=O absorptions at 5.8 and 5.95μ characteristic for ester and amide functional groups, respectively.

EXAMPLE 6

*Ethyl-α-(1-p-Chlorobenzoyl-2-Methyl-5-Methoxy-3-Indolyl)-Propionate*

13 g. of ethyl-(2-methyl-5-methoxy-3-indolyl)-propionate is added to a mixture of 2.5 g. of 51% sodium hydride-mineral oil emulsion in 240 ml. of dimethylformamide. The resulting mixture is stirred at room temperature for 30 minutes and then a solution of 8.75 g. of p-chlorobenzoyl chloride in 50 ml. of dimethylformamide is added slowly thereto over a 40-minute period. The mixture is then stirred in an ice-bath for 4 hours under nitrogen. It is then poured into a mixture of ether, acetic acid and water as described in Example 2. Following the work-up procedure and using a 200 g. column of alumina for the chromatography step, and eluting with a mixture of 1:1 benzene-petroleum ether, ethyl-α-(1 - p - chlorobenzoyl - 2 - methyl-5-methoxy-3-indolyl)-propionate is obtained as a yellow oil.

EXAMPLE 7

*(1-Benzoyl-2-Methyl-5-Methoxy-3-Indolyl)-Acetic Acid*

(A) A solution of 15 g. of methyl-(2-methyl-5-methoxy-3-indolyl)-acetate and 0.2 g. of sodium in 60 ml. of benzyl alcohol is slowly fractionated over a period of 4½ hours through a Vigreux column to remove methanol. The excess benzyl alcohol is then removed by distillation at 60° C. (2.5 mm.) to give a residue of 18.6 g. of benzyl-(2-methyl-5-methoxy-3-indolyl)-acetate.

(B) 10 g. of the benzyl ester obtained above is added to 3.3 g. of 51% sodium hydride-mineral oil emulsion in 260 ml. of dimethylformamide according to the procedure of Example 2. This mixture is treated as described in that example in 7.7 ml. of p-chlorobenzoyl chloride and the reaction mixture worked up by the above-described process using a chromatographic column of 340 g. of alumina and eluting with 20–30% ether in petroleum ether. From these eluates there is obtained benzyl-(1-benzoyl-2-methyl-5-methoxy-3-indolyl)-acetate, M.P. 91–92° C.

(C) 1.5 g. of the ester obtained in part B above is added to 20 ml. of ethyl acetate containing a drop of acetic acid and reduced catalytically at room temperature in the presence of palladium on charcoal catalyst. When the reduction is complete the catalyst is removed by filtration and the filtrate evaporated to a crystalline residue. This residue is recrystallized from aqueous ethanol to give 1-benzoyl-(2-methyl-5-methoxy - 3 - indolyl) - acetic acid, M.P. 172–173° C. Alternatively, the residue obtained on removal of the reaction solvent may be purified by dissolving in chloroform and precipitating by addition of petroleum ether to the chloroform solution.

EXAMPLE 8

*Ethyl-α-(1-p-Fluorobenzoyl-2-Methyl-5-Methoxy-3-Indolyl)-Propionate*

10.5 g. of ethyl-α-(2-methyl-5-methoxy-3-indolyl)-propionate is added to a suspension of 2.2 g. of 51% sodium hydride-mineral oil emulsion in 240 ml. of dimethylformamide. After stirring for 25 minutes, 7.5 g. of p-fluorobenzoyl chloride is added thereto slowly over a 40-minute period, and the resulting mixture stirred for 40 minutes at 10–15° C. The reaction mixture is then poured into 400 ml. of water and the product isolated as described in Example 4 to give substantially pure ethyl-α-(1-p-fluorobenzoyl-2-methyl-5-methoxy - 3 - indolyl)-propionate.

When the above process is carried out by reacting the sodium salt of methyl-α-(2-methyl-5-methoxy-3-indolyl)-propionate with p-trifluoromethylbenzoyl chloride, there is obtained methyl-α-(1-p-trifluoromethylbenzoyl-2-methyl-5-methoxy-3-indolyl)-propionate.

EXAMPLE 9

The corresponding N-1 aroyl or hetero-aroyl derivatives of benzyl-α-(2-methyl-5-methoxy - 3 - indolyl)-propionate and benzyl-(2-methyl-5-methoxy-3-indolyl) - acetate are obtained by reacting together in equimolar amounts and according to the procedure of Example 3, the sodium salts of these esters and one of the compounds: 3,4,5-trimethoxy benzoyl chloride, p-phenoxy benzoyl chloride, p-trifluoroacetyl benzoyl chloride, p-N,N-dimethylsulfamyl benzoyl chloride, p-4'-tolyloxybenzoic acid, p-4'-methoxyphenoxybenzoic acid, p-4'-chlorophenoxybenzoic acid, p-difluoroacetylbenzoic acid, p - monofluoroacetylbenzoic acid, p-cyanobenzoyl chloride, p-carbomethoxyphenzoyl chloride, p-formylbenzoyl chloride, p-trifluoromethylthiobenzoyl chloride, N,N-dimethyl-p - sulfonamidobenzoyl chloride, p-methylsulfinylbenzoyl chloride, p-methylsulfonylbenzoyl chloride, p-benzylthiobenzoyl chloride, p-4'-methylbenzylthiobenzoic acid, p-4'-methoxybenzylthiobenzoic acid, p-4'-chlorobenzylthiobenzoic acid, p-mercaptobenzoyl chloride, p-nitrobenzoyl chloride, p-dimethylaminobenzoyl chloride, p-acetaminobenzoyl chloride, o-fluoro-p-chlorobenzoyl chloride, o-methoxy-p-chlorobenzoyl chloride, o-hydroxy-p-chlorobenzoyl chloride, 2,4,5-trichlorobenzoyl chloride.

The resulting 1-substituted indolyl esters are converted to the corresponding free acids by the procedure of Example 7C.

EXAMPLE 10

*1-p-Chlorobenzoyl-2-Methyl-5-Methoxy-3-Indolyl-Acetic Acid*

(A) *2-methyl-5-methoxy-3-indolylacetic anhydride.*—Dicyclohexylcarbodiimide (10 g., 0.049 mole) is dissolved in a solution of 2-methyl-5-methoxy-3-indolylacetic acid (22 g., 0.10 mole) in 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification in the next step.

(B) *t-Butyl 2-methyl-5-methoxy-3 - indolylacetate.*—t-Butyl alcohol (25 ml.) and fused zinc chloride (0.3 g.) are added to the anhydride from part A. The solution is refluxed for 16 hours and excess alcohol is removed in vacuo. The residue is dissolved in ether, washed several times with saturated bicarbonate, water, and saturated salt solution. After drying over magnesium sulfate, the solution is treated with charcoal, evaporated, and flushed several times with Skellysolve B for complete removal of alcohol. The residual oily ester (18 g., 93%) is used without purification.

(C) *t-Butyl 1-p-chlorobenzoyl-2-methyl-5-methoxy-3-indolylacetate.*—A stirred solution of ester (18 g., 0.065 mole) in dry DMF (450 ml.) is cooled to 4° in an ice bath, and sodium hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours without replenishing the ice bath. The mixture is then poured into 1 l. of 5% acetic acid, extracted with a mixture of ether and benzene, washed thoroughly with water, bicarbonate, saturated salt, dried over magnesium sulfate, treated with charcoal, and evaporated to a residue which partly crystallizes. This is shaken with ether, filtered, and the filtrate is evaporated to a residue (17 g.) which solidifies after being refrigerated overnight. The crude product is boiled with 300 ml. of Skellysolve B, cooled to room temperature, decanted from some gummy material, treated with charcoal, concentrated to 100 ml., and allowed to crystallize. The product thus obtained (10 g.) is recrystallized from 50 ml. of methanol and gives 4.5 g. of analytically pure material, M.P. 103–4°.

(D) *1-p-chlorobenzoyl-2-methyl-5-methoxy-3-indolylacetic acid.*—A mixture of 1 g. ester and 0.1 g. powdered porous plate is heated in an oil bath at 210° with magnetic stirring under a blanket of nitrogen for about 2 hours. No intensification of color (pale yellow) occurs during this period. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid. The crude product (0.4 g., 47%) is recrystallized from aqueous ethanol and dried in vacuo at 65°; M.P. 151°.

EXAMPLE 11

*1-p-Methylthiobenzoyl-2-Methyl-5-Methoxy-3-Indolyl-α-Propionic Acid*

(A) *2-methyl-5-methoxy-3-indolyl-α-propionic anhy-*

*dride.*—Dicyclohexylcarbodiimide (9 g. 0.044 mole) is dissolved in a solution of 2-methyl-5-methoxy-3-indolyl-α-propionic acid (21 g., 0.09 mole) and 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification.

(B) *t-Butyl 2-methyl - 5-methoxy-3-indolyl-α-propionate.*—t-Butyl alcohol (25 ml.) and fused zinc chloride (0.3 g.) are added to the above anhydride. The solution is refluxed for 16 hours, and excess alcohol is removed in vacuo. The residue is dissolved in ether, washed several times with saturated bicarbonate, water and saturated salt solution. After drying over magnesium sulfate the solution is treated with charcoal, evaporated, and flushed several times wtih Skellysolve B for complete removal of alcohol. The residual oil ester (14 g.) is used without purification.

(C) *t-Butyl 1-p-methylthiobenzoyl-2-methyl-5-methoxy-3-indolyl-α-propionate.*—A stirred solution of ester from part "B" (20 g., 0.69 mole) in 450 ml. of dry dimethylformamide is cooled to 4° in an ice bath and sodium hydride (5.2 g., 0.10 mole, 50% susp.) is added in portions. After the mixture is stirred for 10 minutes, p-methylthiobenzoyl chloride (M.P. 51°; 17 g., 0.091 mole) is added in portions during 10 minutes, and the mixture is stirred for 7 hours at room temperature without replenishing the ice bath. The mixture is then poured into 1 l. of 5% acetic acid, extracted with ether, washed thoroughly with water, bicarbonate, saturated salt solution, dried over magnesium sulfate, treated with charcoal, and evaporated in vacuo to a residue (33 g.). This is dissolved in ether, mixed with 100 g. of acid washed alumina, and evaporated in vacuo to dryness, which is placed above a column of 300 g. of acid washed alumina in Skellysolve B. After washing with Skellysolve B, the product is eluted with 5% ether-Skellysolve B, and is obtained as a yellow oil (11 g., 36%).

(D) *1 - p-methylthiobenzoyl-2-methyl-5-methoxy-3-indolyl-α-propionic acid.*—The pyrolysis is carried out in the same manner as with t-butyl 1-p-chlorobenzoyl-2-methyl-5-methoxy-3-indolyl acetate (of Example 10 D). The product is recrystallized from aqueous ethanol or benzene-Skellysolve B: M.P. 175–6°.

EXAMPLE 12

*1-p-Chlorobenzoyl-2-Methyl-5-Methoxy-3-Indolyl-α-Propionic Acid*

(A) To a solution 20.0 g. (0.07 mole) of t-butyl-α-(2-methyl-5-methoxy-3-indolyl)-propionate in 270 ml. dimethylformamide is added in small potrions 7.0 g. (0.14 mole) of 51% sodium hydride in mineral oil under $N_2$ with stirring and ice-cooling. After 15 minutes, 17.5 g. (0.10 mole) of the p-chlorobenzoyl chloride is added dropwise, a white precipitate separates out almost immediately. The mixture is stirred at 0° for 2 hours and is allowed to stand in the cold room overnight. The next morning the mixture is filtered and diluted with ether. One-half of the solution is washed with water, sodium bicarbonate, water successively and dried over sodium sulfate. The dried solution is concentrated to a syrup which is chromatographed on 400 g. of acid-washed alumina. After mineral oil and trace of impurity is eluted by petroleum ether and 5% ether in petroleum ether, the desired product is obtained by elution with 10% ether in petroleum ether as yellow oil. The other half is similarly treated.

(B) The above ester and a few pieces of porous plate chips are placed in a flash submerged in an oil bath. A steady stream of $N_2$ is introduced into the test tube through the opening while the temperature of the oil bath is slowly raised to 215°. After ½ hour at 215°, the mixture is dissolved in ether, filtered and washed with sodium bicarbonate. The bicarbonte extract is acidified with dilute hydrochloric acid, and the precipitate is taken into ether, washed with water, dried over sodium sulfate and evaporated to dryness. The solid residue is recrystallized from a mixture of benzene and petroleum ether to give the desired acid, M.P. 87–88°.

EXAMPLE 13

*Methyl-1-p-Methylaminobenzoyl-2-Methyl-5-Methoxy-3-Indolyl Acetate*

(A) *p-Carbobenzyloxyaminobenzoic acid.*—A mixture of 1.1 moles of carbobenzyloxy chloride, 1.0 mole of p-aminobenzoic acid and 500 ml. of pyridine is stirred four hours at room temperature. It is then poured into water and the precipitated carbobenzyloxyaminobenzoic acid is filtered.

(B) *p-Nitrophenyl-p-carbobenzyloxyaminobenzoate.*—In a 500 ml. round bottom flask (all equipment flame dried) is added 13.9 g. of p-nitrophenol and 12.3 g. p-carbobenzyloxyaminobenzoic acid in 250 ml. dry tetrahydrofuran. Through a dropping funnel is added over 30 minutes 20.6 g. of dicyclohexylcarbodiimide in 100 ml. of dry tetrahydrofuran. The reaction is allowed to run overnight with stirring. The dicyclohexylurea which forms during the reaction is filtered. The filter cake is washed with dry tetrahydrofuran. The solution is evaporated to dryness. The solid is taken up in benzene and washed with sodium bicarbonate solution and then with water and dried over anhydrous sodium sulfate. The solution is concentrated under vacuum to dryness. The solid p-nitrophenyl-p-carbobenzyloxyamino benzoate is then recrystallized from benzene.

(C) *p - Nitrophenyl - p - N-methyl-N-carbobenzyloxyaminobenzoate.*—p - Nitrophenyl-p-carbobenzyloxyaminobenzoate is added to a suspension of sodium hydride in dimethylformamide with stirring and ice cooling. After on hour methyliodide is added and the mixture is stirred overnight. The reaction mixture is poured into ice water and extracted with ether. Evaporation of the ethereal solution and chromatography on an alumina column, using 15–25% v./v. ether in petroleum ether as the eluent, gives p - nitrophenyl-p-N-methyl-N-carbobenzyloxyaminobenzoate.

(D) *Methyl - 1 - p-N-methyl-N-carbobenzyloxyaminobenzoyl-2-methyl-5-methoxy-3-indolylacetate.*—In a 250 ml. round bottom flask (flame dried equipment) is placed at 0° C. with nitrogen, 100 ml. of dry diemthylformamide with 10.5 g. of methyl-α-(2-methyl-5-methoxy-3-indolyl) acetate. To this is added 2.5 g. of 50% sodium hydride mineral oil mixture. After the mixture is stirred for 30 minutes there is added over 15 minutes a solution of 11 g. of p-nitrophenyl-p-N-methyl-N-carbobenzyloxyaminobenzoate in 50 ml. dry dimethylformamide. The reaction mixture stirred for 4 hours at 0° C. under nitrogen followed by stirring under nitrogen at room temperature over night. The reaction mixture is then poured into an ice-water-ether solution containing a few ml. of acetic acid and the layers are separated. The aqueous phase is washed with ether and the ether extracts are combined. To the ether layers is added a saturated solution of hydrogen chloride gas in dry ether. The ether is decanted off, leaving a heavy oil. The oil is washed with ether followed by an addition of aqueous sodium bicarbonate solution. The product is then extracted with ether. The ether layer is dried over anhydrous sodium sulfate and concentrated to dryness. The product, methyl-(1-p-N-methyl - N - carbobenzyloxy-aminobenzoyl-2-methyl-5-methoxy-3-indolyl)acetate, is crystallized from dry ether.

(E) *Methyl-1-p-methylaminobenzoyl-2-methyl-5-methoxy - 3 - indolylacetate.*—Methyl-1-p-N-methyl-N-carbobenzyloxybenzoyl-2-methyl-5-methoxy-3 - indolyacetate is hydrogenated at atmospheric pressure over palladium on charcoal, in ether solution. The mixture is filtered to remove the catalyst. Evaporation of the ether gives methyl - 1-p-methylaminobenzoyl-2-methyl-5-methoxy-3-indolylacetate.

EXAMPLE 14

*Methyl (2-Methyl-5-Nitro-3-Indolyl) Acetate*

A solution of 40 g. of levulinic acid in 300 ml. of hot water is added to a solution of 65 g. of p-nitrophenyl hydrazine hydrochloride in 700 ml. of hot water with stirring. After about one-half hour, the hydrazone derivative is collected in a filter, washed with water and dried at 110° in vacuo. The yield is 84 g., M.P. 175–179°.

An amount of 42 g. of the above hydrazone is added to a solution of 120 g. of fused zinc chloride in 100 ml. of absolute ethanol and the mixture is refluxed for 18 hours. The cooled solution is poured into dilute hydrochloric acid with stirring, and the insoluble gummy material separated is extracted with hot ethanol. The ethanolic extract is evaporated in vacuo to a syrup, which is redissolved in ether. The ether solution is extracted with 10% sodium carbonate several times. Acidification of the aqueous solution gave a crude produce which recrystallizes from chloroform to give (2-methyl-5-nitro-3-indolyl)acetic acid, M.P. 238°.

The above acid is treated with a mixture of 3 g. of sulfuric acid and 40 ml. of methanol at the reflux temperature for 6 hours. The methyl ester is obtained as a yellow crystalline product, M.P. 132–40° after recrystallization from benzene.

Similarly, methyl-α(2-methyl-5-nitro-3-indolyl)-propionate is prepared by using an equivalent amount of α-methyl levulinic acid as the starting material.

EXAMPLE 15

*Methyl(2-Methyl-5-Amino-3-Indolyl) Acetate*

3 g. of methyl(2-methyl-5-nitro-3-indolyl) acetate is dissolved in 300 ml. dry methanol and reduced in hydrogen in an autoclave with Raney nickel as catalyst. After the theoretical amount of hydrogen is taken up the catalyst is removed by filtration. The catalyst and reaction flask are washed with methanol. The methanol solution is evaporated to dryness. The product is crystallized from benzene, M.P. 144–145°. *Microanalysis.*—Calc. C, 66.03; H, 6.47; N, 12.84. Found: C, 65.96; H, 6.29; N, 12.56.

EXAMPLE 16

*Methyl[2-Methyl-5-(1'-Pyrrolidino)-3-Indolyl] Acetate*

In a 125 ml. flask is placed 80 ml. of ethanol. To this is added 1.0 g. of methyl (2-methyl-5-amino-3-indolyl) acetate, 0.99 g. of 1,4-dibromobutane and 0.975 g. of anhydrous sodium carbonate. This mixture is stirred at reflux temperature in a nitrogen atmosphere for 6 hours. The reaction mixture is then filtered and the filtrate is concentrated in vacuo to a small volume and diluted with ether. This solution is then washed with water 2×, dried with anhydrous sodium sulfate and concentrated in vacuo to dryness. The product is absorbed on 6 g. of silica gel. The product is then chromatographed over 30 g. of silica gel using as elutant from v./v. 3:1 ether-petroleum ether to ether. The eluted material is combined and crystallized from benzene-Skellysolve B. M.P. 117–118°. *Microanalysis.*—Calc. C, 70.56; H, 7.40; N, 10.29. Found: C, 70.77; H, 7.72; N, 10.00.

When ethylene dibromide is used instead of dibromobutane, the product obtained is the 5-(1-azacyclopropyl) indolyl compound.

EXAMPLE 17

*Methyl(1-p-Chlorobenzoyl-2-Methyl-5-(1'-Pyrrolidino)-3-Indolyl) Acetate*

In a dry 125 ml. flask is placed 1.2 g. of methyl(2-methyl-5-(1'-pyrrolidino)-3-indolyl) acetate in 60 ml. of dry dimethylformamide. To this solution, cooled to 0° C., is added 0.23 g. of 50% sodium hydride slurry in mineral oil. This mixture is stirred for 30 minutes. Then a solution of 0.8 g. of p-chlorobenzoyl chloride diluted with 5 ml. of dry dimethylformamide is added dropwise. This reaction is stirred for 4 hours at 0° C. under a nitrogen atmosphere. The reaction mixture is then stirred overnight at room temperature under a nitrogen atmosphere. The reaction mixture is added to an ice water-ether mixture containing a few milliliters of acetic acid.

The ether layer is separated and the aqueous layer is washed with ether. The combined ether layers are washed once with sodium carbonate and twice with water, dried over anhydrous sodium sulfate and evaporated in vacuo to an oil. The product is absorbed on 10 g. of silica gel and chromatographed from 60 g. silica gel. The product is collected using v./v. 1:3 to 1:1 ether-petroleum ether. The combined material is crystallized from ether, M.P. 62–64°.

EXAMPLE 18

*Methyl-(1-p-Chlorobenzoyl-2-Methyl-5-Nitro-3-Indolyl) Acetate*

In a dried 250 ml. flask is placed 3.9 g. of methyl-(2-methyl-5-nitro-3-indolyl) acetate in 125 ml. dry dimethylformamide. To this solution cooled to 0° C. is added 0.8 of 50% sodium hydride-mineral oil. This is stirred under nitrogen for 30 minutes. To this is added dropwise 2.75 g. of p-chlorobenzoyl chloride in 15 ml. of dry dimethylformamide over a 5-minute period. The reaction mixture is stirred 4 hours at 0° C. under nitrogen and then stirred overnight at room temperature under nitrogen. It is then poured into an ice water-benzene solution containing a few milliters of acetic acid. The bezene layer is separated and the aqueous layer is washed with benzene. The combined benzene layers are washed with sodium bicarbonate followed by water, dried over anhydrous sodium sulfate and concentrated to dryness in vacuo. The product is crystallized from benzene-Skellysolve B M.P. 170–171°. *Microanalysis.*—Calc. C, 59.00; H, 3.91; N, 7.24. Found: C, 59.24; H, 4.00; N, 7.39.

The corresponding propionate is formed when an equivalent amount of the corresponding methyl-α-(2-methyl-5-nitro-3-indolyl) propionate prepared in Example 14 is used as the starting material.

EXAMPLE 19

*Methyl-(1-p-Chlorobenzoyl-2-Methyl-5-Dimethylamino-3-Indolyl) Acetate*

To a solution of 0.387 g. of methyl-α-(1-p-chlorobenzoyl-2-methyl-5-nitro-3-indolyl) acetate in 20 ml. of distilled dimethoxyethane is added 1.5 ml. of glacial acetic acid and 0.5 ml. of a 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to an oil. *Microanalysis.*—Calc. C, 65.50; H, 5.50; N, 7.28. Found: C, 65.66; H, 5.91; N, 7.46.

EXAMPLE 20

*Methyl-(1-p-Chlorobenzoyl-2-Methyl-5-Acetamino-3-Indolyl) Acetate*

To 0.388 g. of methyl-(1-p-chlorobenzoyl-2-methyl-5-nitro-3-indolyl) acetate in 30 ml. of anhydrous ethyl acetate is added 0.306 g. acetic anhydride. The mixture is reduced with Raney nickel at room temperature and 40 p.s.i. After the theoretical amount of hydrogen has been absorbed, the catalyst is removed by filtration. The solution is concentrated in vacuo to a small volume and poured into an ice water-ether mixture. The ether layer is separated and the aqueous layer is washed with ether. The combined ether extracts are washed with sodium bicarbonate followed by water, dried with anhydrous sodium sulfate and concentrated in vacuo to dryness. The product is crystallized from benzene and ether, M.P. 176–177° C. *Microanalysis.*—Calc. C, 63.25; H, 4.80; N, 7.02. Found: C, 63.40; H, 4.82; N, 6.89.

EXAMPLE 21

*Benzyl-(2-Methyl-5-Nitro-3-Indolyl) Acetate*

In a dry 250 ml. flask is placed 80 ml. dry benzene and 20 ml. benzyl alcohol. To this is added 3.0 g. of 2-methyl-5-nitro-3-indolyl acetic acid and 0.2 g. of p-toluenesulfonic acid. This slurry (which clears on heating) is heated to reflux under nitrogen. The water formed during the reaction is collected in a Stark and Dean tube. The reaction is stopped when the distillate is clear (about 2 hours). The excess benzyl alcohol is removed in vacuo. The residue is dissolved in benzene and washed with sodium bicarbonate followed by water, dried over anhydrous magnesium sulfate and concentrated in vacuo. The product is absorbed on 15 g. of acid washed alumina and chromatographed over 75 g. of acid washed alumina. The product is eluted with v./v. 1:1—3:1 ether-benzene. The eluate is evaported and the combined product is crystallized from benzene-Skellysolve B M.P. 147–148°. *Microanalysis.*—Calc. C, 66.66; H, 4.97; N, 8.64. Found: C, 66.83; H, 4.77; N, 8.52.

EXAMPLE 22

*Benzyl-(1-p-Chlorobenzoyl-2-Methyl-5-Nitro-3-Indolyl) Acetate*

In a dry 125 ml. flask is placed 3.0 g. of benzyl-(2-methyl-5-nitro-3-indolyl) acetate in 60 ml. of dry dimethylformamide. To this solution, cooled to 0° C. in a nitrogen atmosphere is added 0.475 g. of 50% sodium hydride-mineral oil. This is stirred for 30 minutes. Then 1.65 g. of p-chlorobenzoyl chloride in 10 ml. of dry dimethylformamide is added dropwise over a 5-minute period. The reaction mixture is stirred at 0° C. for 4 hours under a nitrogen atmosphere followed by stirring at room temperature under nitrogen overnight. It is then poured into an ice water-benzene mixture. The benzene layer is separated and the aqueous layer is washed with benzene. The combined benzene extracts are washed with sodium bicarbonate followed by water, dried with anhydrous sodium sulfate and concentrated in vacuo to dryness. The product is crystallized from benzene-Skellysolve B M.P. 166–167° C. *Microanalysis.*—Calc. C, 64.86; H, 4.14; N, 6.05. Found: C, 64.78; H, 4.22; N, 5.91.

EXAMPLE 23

*Methyl-α-(1-p-Chlorobenzoyl-2-Methyl-5-Amino - 3 - Indolyl)Propionate*

0.025 M of methyl-α-(1-p-chlorobenzoyl-2-methyl-5-nitro-3-indolyl) propionate in 100 ml. of ethanol is hydrogenated in the presence of 120 mg. of 10% palladium or charcoal catalyst at 40 p.s.i. at room temperature. After 0.075 M of hydrogen has been consumed, the hydrogenation is stopped, and the solution filtered to remove the catalyst. The filtrate is concentrated to dryness in vacuo to give methyl-α-(1-p-chlorobenzoyl-2-methyl-5-amino-3-indolyl)propionate.

EXAMPLE 24

*Methyl-1-p-Chlorobenzoyl-2-Methyl-5 - Methylamino - 3-Indolylacetate*

A mixture of 1.1 mole of carbobenzyloxy chloride, 500 ml. of pyridine and 1.0 mole of methyl-1-p-chlorobenzoyl-2-methyl-5-amino-3-indolylacetate is stirred at room temperature four hours. It is then poured into water and the 5-carbobenzyloxyamino indolyl compound is filtered, washed and dried.

The 5-carbobenzyloxyamino indolyl compound is then added to a suspension of sodium hydride in dimethylformamide with stirring and ice-cooling. After one hour, methyliodide is added and the mixture is stirred overnight. The reaction mixture is poured into ice water and extracted with ether. Evaporation of the ethereal solution and chromatography of the residual oil on an alumina column, using 15–25% (v./v.) ether in petroleum ether as the eluent, gives methyl-1-p-chlorobenzoyl-2-methyl-5-(N-methyl-carbobenzyloxyamino)-3-indolylacetate.

The product is subjected to hydrogenation at atmospheric pressure over palladium on charcoal, in ether solution. The mixture is then filtered to remove the catalyst. Evaporation of the ether gives methyl-1-p-chlorobenzoyl-2-methyl-5-methylamino-3-indolylacetate.

EXAMPLE 25

(A) *Methyl-[1-p-chlorobenzoyl-2-methyl-5-bis(β - hydroxyethyl)amino-3-indolyl]acetate.*—A mixture of 0.02 mole of methyl-α-(1-p-chlorobenzoyl-2-methyl-5 - amino-3-indolyl)propionate, 0.044 mole of ethylene oxide and 0.03 mole of acetic acid in 300 ml. dimethoxyethane is heated to 100° for 18 hours in an autoclave. The mixture is then diluted with water and filtered to yield crude methyl-[1-p-chlorobenzoyl-2-methyl - 5 - bis(β - hydroxyethyl)amino-3-indolyl]-propionate.

When an equivalent amount of propylene oxide is used in the above procedure in place of the ethylene oxide, there is obtained methyl-[1-p-chlorobenzoyl-2-methyl-5-bis(hydroxypropyl)amino-3-indolyl]-propionate.

(B) *Methyl-[1-p-chlorobenzoyl-2-methyl-5-(4'-methyl-1'-piperazinyl)-3-indolyl]acetate.*—The product of A is stirred at 0° in pyridine with two mole proportions of p-toluenesulfonyl chloride until the reaction is substantially complete. The mixture is poured into water and the 5-bis(p-toluenesulfonyloxyethyl)amino compounds is isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields methyl-[1-p-chlorobenzoyl-2-methyl-5-(4'-methyl-1'-piperazinyl) - 3 - indolyl] acetate.

Either of the above products, that form Part A or Part B, when used in the procedure of Example 7, gives the corresponding free acid.

EXAMPLE 26

*Methyl-[1-p-Chlorobenzoyl-2-Methyl-5-(4'-Morpholinyl)-3-Indolyl]Acetate*

A solution of tosyl chloride (0.1 mole) in 200 ml. benzene is added dropwise with stirring to a solution of methyl-α-[1-p-chlorobenzoyl-2-methyl-5-bis(β - hydroxyethyl)amino-3-indolyl]acetate (0.1 mole) and pyridine (0.3 mole) in 300 ml. benzene at room temperature over a period of one hour. The mixture is then heated under reflux for 3 hours, washed with water, dried over sodium sulfate and evaporated to a syrup. Chromatography of the syrup on an alumina column using 30–50% (v./v.) ether in petroleum ether as the eluent gives methyl-[1-p-chlorobenzoyl-2-methyl-5-(4'-morpholinyl) - 3 - indolyl] acetate.

The above product, when used in the procedure of Example 7, gives the corresponding free acid.

EXAMPLE 27

(A) *2-methyl-5-cyano-3-indolyl acetic acid methyl ester.*—A solution of p-cyano phenylhydrazine (0.1 mole) and levulinic acid (0.1 mole) in 200 ml. concentrated hydrochloric acid is heated at 90° for 20 minutes and diluted with iced water (400 ml.). The crude product which separates is extracted with ether and chromatographed on a silica gel column to give 2-methyl-5-cyano-3-indolyl acetic acid using 20–50% (v./v.) ether and petroleum ether as the eluent.

The methyl ester is prepared by treatment with diazomethane in ether until the yellow of diazomethane persists and the mixture is evaporated.

(B) *Methyl - α - (1 - p-chlorobenzoyl - 2 - methyl - 5-cyano-3-indolyl)acetate.*—Alkylation of the ester (prepared in Example 26A above) in dimethylformamide with sodium hydride and p-chlorobenzoyl chloride, by the procedure of Example 2, gives methyl-(1-p-chlorobenzoyl-2-methyl-5-cyano-3-indolyl) acetate.

(C) *Methyl - α - (1 - p - chlorobenzoyl - 2 - methyl-5-aminomethyl-3-indolyl)acetate.*—The 5-cyano ester prepared in Example 27B is hydrogenated in ethanol in the presence of Raney nickel and 3 moles of anhydrous ammonia at 2000 p.s.i. at room temperature to give, after filtration of the catalyst and evaporation of the reaction mixture, methyl (1 - p - chlorobenzoyl - 2 - methyl - 5-aminomethyl-3-indolyl)acetate which can be recrystallized from aqueous ethanol.

(D) *Methyl - (1 - p - chlorobenzoyl - 2 - methyl - 5-dimethylaminomethyl - 3 - indolyl)acetate.*—Treatment of the above α-aminomethyl indole with 2 moles of methyl iodide gives the 5-dimethylaminomethyl derivative. When ethyliodide is used in place of methyl iodide, the 5-diethylaminomethyl derivative is obtained.

(E) When the products of Examples 27C and 27D above are used in the procedure of Example 7, the corresponding free acids are obtained.

EXAMPLE 28

*α-(1-p-Methylmercaptobenzoyl-2-Methyl-5-Methoxy-3-Indolyl)-Butyric Acid*

When the procedure of Examples 1 and 2 are followed using ethyl α-ethyl levulinate in place of ethyl α-methyl levulinate, there is obtained successively ethyl α-(2-methyl-5-methoxy-3-indolyl)-butyrate and ethyl α-(1-p-methylmercaptobenzoyl - 2 - methyl - 5 - methoxy - 3 - indolyl)-butyrate. When the latter product is used in the procedure of Example 7 the corresponding butyric acid derivative is obtained.

The starting ethyl α-ethyl levulinate is prepared by alkylation of the sodio derivative of ethyl acetoacetate in ethanol with 1 m. of ethyl α-bromobutyrate, followed by hydrolysis and decarboxylation. The α-ethyl levulinic acid obtained is reesterified with 2 N ethanolic hydrogen chloride at reflux temperature for 18 hours.

EXAMPLE 29

6.5 g. (0.02 mole) of α-(1-benzoyl-2-methyl-5-methoxy-3-indolyl)-acetic acid is added to 50 ml. of water which has been flushed with nitrogen. The slurry is stirred under nitrogen and 20 ml. of 1.05 N sodium carbonate added with stirring. When a clear solution is obtained, a solution of 2.2 g. of $Al_2(SO_4)_3 \cdot 18H_2O$ in 8 ml. of water is added with vigorous stirring. The mixture is stirred until it is homogenous and the solid aluminum salt of (1-benzoyl-2-methyl-5-methoxy-3-indolyl) acetic acid, is recovered by filtration and washed with water and with ethanol.

In a similar fashion, there may be prepared the sodium and aluminum salts as well as other salts, such as the potassium, iron and magnesium salts, of the various (3-indolyl) aliphatic acids described in the accompanying examples.

EXAMPLE 30

*1-(p-Chlorobenzoyl-2-Methyl-5-Methoxy-3-Indolyl)-Acetic Anhydride*

The procedure of Example 10A is followed using 1-(p - chlorobenzoyl - 2 - methyl - 5 - methoxy - 3 - indolyl)acetic acid in place of the 1-unsubstituted acid. The product, 1 - p - chlorobenzoyl - 2 - methyl - 5 - methoxy-3-indolyl acetic anhydride, is found on testing to be about equal to the free acid in the alleviation of inflammation.

When any of the other free indolyl acids herein described are used in the procedure of Example 10, the corresponding anhydride is obtained.

EXAMPLE 31

The corresponding N-1 aroyl or heteroaroyl derivatives of benzyl - α - (2 - methyl - 5 - methoxy - 3 - indolyl)-propionate, benzyl - (2 - methyl - 5 - methoxy-3-indolyl)-acetate and benzyl-(2-methyl-5-nitro-3-indolyl) acetate are obtained by reacting these esters by the procedure of Example 13B with the p-nitrophenyl esters of the following acids, the p-nitrophenyl esters having been obtained from the acids by the procedure of Example 13A, using in each case the equivalent amount of the selected acid in place of the p-methylaminobenzoic acid used in 13A and of its nitrophenyl ester used in 13B and equivalent quantities of the indolyl esters: p-difluoromethoxy benzoic acid (prepared by the action of difluorochloromethane on benzyl p-hydroxybenzoate followed by hydrogenation of the benzyl group), p-fluoromethoxybenzoic acid (similarly prepared from fluorochloromethane and benzyl p-hydroxybenzoate), p-aminobenzoic acid. The esters so obtained are converted to the free acids by the procedure of Example 7C.

EXAMPLE 32

*Ethyl-α-(1-p-Chlorobenzoyl-2-Methyl-5-Ethoxy-3-Indolyl) Propionate*

The procedure of Example 1A is followed using an equivalent quantity of p-ethoxyphenylhydrazine hydrochloride in place of the methoxyphenylhydrazine to give ethyl-α-(2-methyl-5-ethoxy-3-indolyl) propionate. When this is used in the procedure of Example 3 there is obtained ethyl-α-(1-p-chlorobenzoyl-2-methyl-5-methoxy-3-indolyl) propionate. This product, when used in the procedure of Example 7, yields the corresponding free α-indolyl propionic acid.

Similarly when p-propoxy, p-butoxy, p-benzyloxy, p-4-methylbenzyloxy, p-4-methoxybenzyloxy, p-4-chlorobenzyloxy phenylhydrazine are used in the above procedures, the correspondingly 5-substituted indolyl acids are obtained. When the 1-p-chlorobenzyl-2-methyl-5-benzyloxy-(N-substituted benzyloxy)-3-indolyl propionic acids so prepared are subjected to catalytic hydrogenation over palladium, there is obtained α-(1-p-chlorobenzyl-2-methyl-5-hydroxy-3-indolyl) propionic acid.

When the procedure of Example 1A is followed using in place of the p-methoxyphenylhydrazine, equivalent amounts of p-ethylphenylhydrazine, p-butylphenylhydrazine, p-trifluoromethylphenylhydrazine, p-chlorophenylhydrazine and p-fluorophenylhydrazine (each obtainable by diazotization of the corresponding p-substituted aniline and reduction of the diazo) and the resultant indolyl ester is acylated by the procedure of Example 3 and further treated by the procedure of Example 7, the corresponding 5-substituted indolyl esters and acids are obtained.

When the procedure of Examples 1A, 3 and 7 are followed starting with phenylhydrazine, the corresponding 5-unsubstituted indolyl esters and acid are produced.

EXAMPLE 33

*1-Benzyl-2-Methyl-5-Methoxy-3-Indolyl-Acetamide*

To a suspension of 1.0 g. of 50% sodium hydride in 80 ml. benzene is added 4.4 g. of 2-methyl-5-methoxy-3-indolylacetamide with stirring. Twenty ml. of dimethylformamide is then added, followed by 2.8 g. benzoyl chloride twenty minutes later. The reaction mixture is stirred at room temperature for 1 hour and then poured into 400 ml. of ice and water. The precipitate is collected on a filter, M.P. 215–218°. The crude product is recrystallized from ethyl acetate twice, M.P. 219–220°. Its ultra violet absorption spectrum in ethanol shows maxima at λ max 2675 A., $E^{1\%}$ 406 and λ max 3160 A., $E^{1\%}$ 188. Characteristic of a N-benzoyl indole chromophore. *Microanalysis.*—Calculated for $C_{19}H_{16}N_2O_3$: C, 71.24; H, 5.03. Found: C, 71.00; H, 5.35.

EXAMPLE 34

1-Benzoyl-2-Methyl-5-Methoxy-3-Indolyl-Acetic Acid

To a solution of 3.2 g. of 1-benzoyl-2-methyl-5-methoxy-3-indolylacetamide in 50 ml. dimethoxyethane containing 1 ml. of 12 N hydrochloric acid at 0° is added 0.7 g. of sodium nitrite with stirring. After gas evolution has subsided the mixture is poured into 200 ml. of iced water and the precipitate is extracted with methylene chloride. The methylene chloride solution is extracted with sodium bicarbonate solution. Acidification of the aqueous solution with 2 N hydrochloric acid precipitates the desired acid which is purified by recrystallization from benzene and from ethyl acetate-Skellysolve B.

EXAMPLE 35

The acylation procedures of Example 3 or of Example 12A are followed using various aromatic acyl chlorides in equivalent quantities in place of p-chlorobenzoyl chloride and using, as necessary, esters of 2-methyl-5-methoxy-3-indolyl acetic acid or of α-(2-methyl-5-methoxy-3-indolyl)propionic acid. Some of the resulting esters are converted to the corresponding free acid by the method of Example 7 or of 12B as indicated below. Where the method of Example 12B is used, the 1-acylation is by the process of Example 12A. The products obtained by these experiments are: (1-p-methoxybenzoyl-2-methyl-5-methoxy-3-indolyl)acetic acid M.P. 88–89° C. (free acid by method of Example 7), α-(1-p-methoxybenzoyl-2-methyl-5-methoxy-3-indolyl)propionic acid M.P. 65° C. (free acid by method of Example 7), methyl-(1-p-bromobenzoyl-2-methyl-5-methoxy-3-indolyl) acetate M.P. 106–107.5 C., methyl - (1 - p - nitrobenzoyl - 2 - methyl - 5 - methoxy-3-indolyl)acetate M.P. 130–132° C., methyl-(1-o-chlorobenzoyl-2-methyl-5-methoxy-3-indolyl)acetate M.P. 91–93° C., methyl-(1-m-chlorobenzoyl-2-methyl-5-methoxy-3-indolyl) acetate M.P. 51–52° C., methyl-(1-p-phenylbenzoyl-2-methyl-5 - methoxy - 3 - indolyl) acetate M.P. 101.5–103° C., methyl-(1-p-acetoxybenzoyl-2-methyl-5-methoxy-3-indolyl) acetate M.P. 99–101° C., t-butyl-α-(1-p-bromobenzoyl-2-methyl-5-methoxy-3 - indolyl) propionate M.P. 103–105° C., methyl-(1-α-naphthoyl-2-methyl-5-methoxy-3-indolyl) acetate (oil), methyl-(1-p-benzyloxybenzoyl-2-methyl-5-methoxy-3-indolyl) acetate M.P. 116–118° C., methyl-(1-p-hydroxybenzoyl-2-methyl-5-methoxy-3-indolyl) acetate M.P. 155–158° C. (prepared from the p-benzyloxybenzoyl compound by catalytic hydrogenation over palladium), methyl-(1-o-benzyloxybenzoyl-2-methyl-5-methoxy-3-indolyl) acetate (not isolated-used to prepare next compound by catalytic hydrogenation over palladium), methyl-(1-o-hydroxybenzoyl-2-methyl-5-methoxy-3-indolyl) acetate (oil), methyl-(1 - o - fluorobenzoyl - 2 - methyl - 5 - methoxy - 3 - indolyl) acetate M.P. 98–99° C., methyl-(1-β-naphthoyl-2-methyl-5-methoxy-3-indolyl) acetate M.P. 120–124° C., (1-p-trifluoromethylbenzoyl-2-methyl - 5 - indolyl) acetic acid M.P. 169–171° C. (method of Example 12), methyl [1-(2,6-dimethoxybenzoyl)-2-methyl-5 - methoxy - 3 - indolyl] acetate M.P. 139.5–141° C., methyl [1-(o,p-dichlorobenzoyl-2-methyl-5-methoxy-3-indolyl) acetate (oil), methyl - (1 - p - ethoxybenzoyl - 2-methyl-5-methoxy-3-indolyl) acetate, methyl-(1-p-propoxybenzoyl-2-methyl-5-methoxy-3-indolyl) acetate, methyl-(1-p-4'-methylbenzyloxybenzoyl-2-methyl-5-methoxy-3-indolyl) acetate, methyl-(1-p-4'-methoxybenzyloxybenzoyl-2-methyl-5-methoxy-3-indolyl) actate, methyl-(1-p-4'-chlorobenzyloxybenzoyl-2-methyl-5-methoxy-3-indolyl) acetate.

EXAMPLE 36

The procedure of Example 1A is followed using an equivalent quantity of each of the following phenylhydrazines in place of the p-methoxyphenyl hydrazines; p-dimethylsulfonamidophenylhydrazine, p - benzylmercaptophenylhydrazine, p-vinylphenylhydrazine.

When the resulting indolyl acid is acylated by the procedure of Example 3, the corresponding 1-chlorobenzoyl indolyl acids are obtained.

EXAMPLE 37

Methyl-5-methoxy-3-indolylacetate is reduced at 4000 p.s.i. of hydrogen over nickel catalyst at rom temperature. The resultant methyl-5-methoxy-2,3-dihydro-3-indolyl acetate is acylated by the procedure of Example 3 to give methyl - (1-p-chlorobenzoyl-5-methoxy-2,3-dihydro-3-indolyl) acetate. When this is stirred at room temperature in 100 times its weight of a 0.1 N solution of sodium hydroxide in 95% ethanol, the corresponding free acid is obtained.

EXAMPLE 38

Methyl 1-p-Chlorobenzoyl-2-Methyl-5-Allyloxy-3-Indolyl Acetate (A) *Methyl 5-hydroxy-2-methyl-3-indolyl acetate.*—
A mixture of 10 g. of methyl 5-methoxy-2-methyl-3-indolyl-acetate and 50 g. of pyridine hydrochloride is heated at 180° under nitrogen for 15 minutes. The reaction mixture is then cooled to about 50°, dissolved in 150 ml. of 1.5 N methanolic hydrogen chloride and refluxed for 2 hours. After cooling, the solution is concentrated in vacuo, poured into water and extracted with ether. The ethereal solution is washed with water and extracted three times with 50 ml. of 5% sodium hydroxide. The combined aqueous extract is acidified to pH 6 and extracted with ether. After drying over sodium sulfate, the etheral solution is evaporated to give methyl 5-hydroxy-2-methyl-3-indolyl acetate, recrystallized from benzene, M.P. 158–170° (3.4 g.).

(B) *Methyl-2-methyl-5-allyloxy - 3 - indolyl acetate.*—
A mixture of 3.4 g. of the 5-hydroxy-indole, 2.4 g. of allylbromide and 7.5 g. of potassium carbonate is stirred at room temperature to 56° for 18 to 6 hours. The reaction mixture is filtered, concentrated in vacuo to a syrup and chromatographed on 60 g. of silica gel, using v./v. 50% ether in petroleum ether as eluent to give 0.7 g. of methyl 5-allyloxy-2-methyl-3-indolyl acetate as an oil.

(C) *1-p-chlorobenzoyl-2-methyl-5-allyloxy - 3 - indolyl acetate.*—The procedure of Example 3 is followed, using the above 5-allyloxy compound in place of the 5-methoxy compound to give methyl-(1-p-chlorobenzoyl-2-methyl-5-allyloxy-3-indolyl) acetate, M.P. 76–77.5°, recrystallized from benzene-Skellysolve B.

Similarly when allyl bromide is replaced by an equivalent amount of cyclopropylmethyl bromide, cyclobutylmethyl bromide, and isopropyl bromide.

The corresponding 5-cyclopropylmethoxy, 5-cyclobutylmethoxy, 5-isopropoxy-analogs are obtained.

EXAMPLE 39

3-Trifluoromethylphenylhydrazine 250 ml. of chilled concentrated hydrochloric acid is slowly added with stirring, to 0.40 of a mole of freshly distilled 3-aminobenzotrifluoride, which is kept cooled in an ice salt bath. When the temperature of the above suspension is 0°, a precooled solution of 0.40 of a mole of sodium nitrite in 125 ml. of water is added through a separating funnel, whose tip is immersed below the surface of the suspension. The addition is carried out over 75 minutes, maintaining the reaction below 3°. A chilled solution of 0.89 moles of stannous chloride dihydrate in 200 ml. of concentrated hydrochloric acid is then added dropwise to this stirred and cooled diazonium solution, over a period of three hours. During this addition, the temperature is maintained at 0–5° and after the addition, the solution is stirred for an additional hour at 0°. The resulting solid is collected by filtration, pressed as dry as possible and then shaken with 700 ml. of 25% sodium hydroxide. The yellow mixture obtained is allowed to stand overnight at room temperature. The mixture is then extracted with three 300 ml. portions of benzene. The combined filtered benzene solution is dried over 20–30 gms. of potassium hydroxide. Distillation, under vacuum, of this benzene solution gives 3-trifluoromethylphenylhydrazine.

When equivalent amounts of 2-amino-benzotrifluoride, 4-methoxy-3-trifluoromethylaniline, 4-methoxy-2-trifluoromethylaniline, 4-nitro-3-trifluoromethylaniline, 4-nitro-2-trifluoromethylaniline, or 4-methyl-3-trifluoromethylaniline is employed, in the above procedure in place of 3-aminobenzotrifluoride, there is obtained 2-trifluoromethylphenylhydrazine, 4-methoxy-3-trifluoromethylphenylhydrazine, 4-methoxy-2-trifluoromethylhydrazine, 4-nitro-3-trifluoromethylphenylhydrazine, 4-nitro-2-trifluoromethylphenylhydrazine, or 4-methyl-3-trifluoromethylphenylhydrazine, respectively.

EXAMPLE 40

*Methyl-4- and 6-Trifluoromethyl-3-Indolylacetate*

0.2 mole of methyl-γ,γ-dimethoxybutyrate is added, dropwise with stirring, to a solution of 0.2 mole of 3-trifluoromethylphenylhydrazine in 75 ml. of 50% acetic acid. The mixture is allowed to stir at room temperature for three hours, and then 300 ml. of water is added. The crude hydrazone which separates out is collected and dried in vacuo. 0.04 mole of the dried hydrazone is then intimately mixed with 0.85 mole of freshly fused zinc chloride. To this mixture is added, with stirring, for 5 minutes at room temperature, 135 ml. of glacial acetic acid and 5 ml. acetic anhydride. The mixture is then refluxed for one hour and cooled to room temperature. This resulting mixture is poured onto chopped ice and water and allowed to stand overnight in a refrigerator. The solid is collected and precipitated by filtration and chromatographed on acid-washed alumina and eluted with ether-petroleum ether (v./v. 5–50%). The two isomers which are obtained, namely, methyl-(4-trifluoromethyl-3-indolyl)acetate and methyl-(6-trifluoromethyl-3-indolyl)acetate are differentiated by nuclear magnetic resonance spectroscopy.

When equivalent amounts of 4-methoxy-3-trifluoromethylphenylhydrazine,
4-nitro-3-trifluoromethylphenylhydrazine, or
4-methyl-3-trifluoromethylphenylhydrazine is employed in the above procedure in place of 3-trifluoromethylphenylhydrazine, there is obtained both isomers of each, namely, methyl-(5-methoxy-4-trifluoromethyl-3-indolyl)acetate;
methyl-(5-methoxy-6-trifluoromethyl-3-indolyl)acetate;
methyl-(5-nitro-4-trifluoromethyl-3-indolyl)acetate;
methyl-(5-nitro-6-trifluoromethyl-3-indolyl)acetate; or
methyl-(5-methyl-4-trifluoromethyl-3-indolyl)acetate;
methyl-(5-methyl-6-trifluoromethyl-3-indolyl)acetate; respectively.

Similarly, when equivalent amounts of 2-trifluoromethylphenylhydrazine,
4-methoxy-2-trifluoromethylhydrazine,
4-nitro-2-trifluoromethylphenylhydrazine, or
4-methyl-2-trifluoromethylphenylhydrazine is employed in place of 3-trifluoromethylphenylhydrazine, there is obtained methyl-(7-trifluoromethyl-3-indolyl)acetate;
methyl-(5-methoxy-7-trifluoromethyl-3-indolyl)acetate;
methyl-(5-nitro-7-trifluoromethyl-3-indolyl)acetate, or
methyl-(5-methyl-7-trifluoromethyl-3-indolyl)acetate, respectively.

EXAMPLE 41

*Methyl-α-[4- or 6-Trifluoromethyl-3-Indolyl]Propionate*

When the procedure of Example 40 is followed, using methyl-γ,γ-dimethoxy-α-methyl-butyrate in place of methyl-γ,γ-dimethoxybutyrate, there is obtained two isomers, namely, methyl-α-(4-trifluoromethyl-3-indolyl)propionate and methyl-α-(6-trifluoromethyl-3-indolyl)propionate.

When equivalent amounts of 4-methoxy-3-trifluoromethylphenylhydrazine,
4-nitro-3-trifluoromethylphenylhydrazine, or
4-methyl-3-trifluoromethylphenylhydrazine is employed in place of 3-trifluoromethylphenylhydrazine, there are obtained both isomers of each namely, methyl-α-(5-methoxy-4-trifluoromethyl-3-indolyl)propionate,
methyl-α-(5-methoxy-6-trifluoromethyl-3-indolyl)propionate,
methyl-α-(5-nitro-4-trifluoromethyl-3-indolyl)propionate,
methyl-α-(5-nitro-6-trifluoromethyl-3-indolyl)-propionate,
methyl-α-(5-methyl-6-trifluoromethyl-3-indolyl)-propionate, respectively.

Similarly, when equivalent amounts of 2-trifluoromethylphenylhydrazine,
4-methoxy-2-trifluoromethylphenylhydrazine,
4-nitro-2-trifluoromethylphenylhydrazine, or
4-methyl-2-trifluoromethylphenylhydrazine is employed in place of 3-trifluoromethylphenylhydrazine, there is obtained methyl-α-(7-trifluoromethyl-3-indolyl)propionate,
methyl-α-(5-methoxy-7-trifluoromethyl-3-indolyl)propionate,
methyl-α-(5-methoxy-7-trifluoromethyl-3-indolyl)propionate,
methyl-α-(5-nitro-7-trifluoromethyl-3-indolyl)propionate, or
methyl-α-(5-methyl-7-trifluoromethyl-3-indolyl)propionate, respectively.

EXAMPLE 42

*Methyl-(2-Methyl-4- or 6-Trifluoromethyl-3-Indolyl) Acetate*

When the procedure of Example 40 is followed, using methyl levulinate in place of methyl-γ,γ-dimethoxybutyrate, there is obtained two isomers, namely, methyl-(2-methyl-4-trifluoromethyl-3-indolyl)acetate and methyl-(2-methyl-6-trifluoromethyl-3-indolyl)acetate.

When equivalent amounts of 4-methoxy-3-trifluoromethylphenylhydrazine,
4-nitro-3-trifluoromethylphenylhydrazine, or
4-methyl-3-trifluoromethylphenylhydrazine is employed in place of 3-trifluoromethylphenylhydrazine, there is obtained both isomers of each, namely, methyl-(5-methoxy-2-methyl-4-trifluoromethyl-3-indolyl)acetate;
methyl-(5-methoxy-2-methyl-6-trifluoromethyl-3-indolyl)acetate;
methyl-(2-methyl-5-nitro-4-trifluoromethyl-3-indolyl)acetate,
methyl-(2-methyl-5-nitro-6-trifluoromethyl-3-indolyl)acetate; or
methyl-(2,5-dimethyl-4-trifluoromethyl-3-indolyl)acetate,
methyl-(2,5-dimethyl-6-trifluoromethyl-3-indolyl)acetate, respectively.

Similarly, when equivalent amounts of 2-trifluoromethylphenylhydrazine,
4-methoxy-2-trifluoromethylphenylhydrazine,
4-nitro-2-trifluoromethylphenylhydrazine, or
4-methyl-2-trifluoromethylphenylhydrazine is employed in place of 3-trifluoromethylphenylhydrazine, there is obtained methyl-(2-methyl-7-trifluoromethyl-3-indolyl)-acetate, methyl-(5-methoxy-2-methyl-7-trifluoromethyl-3-
indolyl)-acetate,
methyl-(2-methyl-5-nitro-7-trifluoromethyl-3-indolyl)-
acetate, or
methyl-(2,5-dimethyl-7-trifluoromethyl-3-indolyl)-
acetate, respectively.

EXAMPLE 43

*Methyl-α-(2-Methyl-Trifluoromethyl-3-Indolyl) Propionate*

When the procedure of Example 40 is followed, using methyl-α-methyl levulinate in place of methyl-γ,γ-dimethoxybutyrate, there is obtained two isomers, namely, methyl - α - (2 - methyl - 4 - trifluoromethyl - 3 - indolyl)-propionate and methyl - α - (2-methyl-6-trifluoromethyl-3-indolyl)-propionate.

When equivalent amounts of 4-methoxy-3-trifluoromethylphenylhydrazine, 4 - nitro-3-trifluoromethylphenylhydrazine, or 4 - methyl - 3 - trifluoromethylphenylhydrazine is employed in place of 3-trifluoromethylphenylhydrazine, there is obtained both isomers of each, namely,
methyl-α-(5-methoxy-2-methyl-4-trifluoromethyl-3-
indolyl)-propionate,
methyl-α-(5-methoxy-2-methyl-6-trifluoromethyl-3-
indolyl)-propionate;
methyl-α-(2-methyl-5-nitro-4-trifluoromethyl-3-indolyl)-
propionate,
methyl-α-(2-methyl-5-nitro-6-trifluoromethyl-3-indolyl)-
propionate; or
methyl-α-(2,5-dimethyl-4-trifluoromethyl-3-indolyl)-
propionate,
methyl-α-(2,5-dimethyl-6-trifluoromethyl-3-indolyl)
propionate, respectively.

Similarly, when equivalent quantities of 2-trifluoromethylphenylhydrazine, 4-methoxy-2-trifluoromethylphenylhydrazine, 4 - nitro-2 - trifluoromethylphenylhydrazine, or 4-methyl-2-trifluoromethylphenylhydrazine is employed in place of 3-trifluoromethylphenylhydrazine, there is obtained
methyl-α-(2-methyl-7-trifluoromethyl-3-indolyl)-
propionate,
methyl-α-(5-methoxy-2-methyl-7-trifluoromethyl-3-
indolyl)-propionate,
methyl-α-(2-methyl-5-nitro-7-trifluoromethyl-3-indolyl)-
propionate, or
methyl-α-(2,5-dimethyl-7-trifluoromethyl-3-indolyl)-
propionate, respectively.

EXAMPLE 44

*1-Benzoyl-4-Trifluoremethyl-3-Indolyl)Acetic Acid*

(A) A solution of 0.05 mole of methyl-(4-trifluoromethyl-3-indolyl)acetate and 0.01 mole of sodium in 60 ml. anhydrous benzyl alcohol is slowly fractionated over a period of 4½ hours through a Vigreux column to remove methanol. The excess benzyl alcohol is removed by distillation at 60° and 2.5 mm. to give a residue of crude benzyl-(4-trifluoromethyl-3-indolyl)acetate.

(B) A suspension of 0.046 mole of 50% sodium hydride-mineral oil in 250 ml. of dimethylformamide is stirred for 20 minutes under nitrogen, with ice-cooling. Then 0.035 mole of the benzyl ester obtained above is added and the mixture stirred for 20 minutes. 0.046 mole of p-benzoylchloride in 50 ml. of dimethylformamide is added dropwise over a period of 30 minutes. The mixture is stirred in an ice-bath for 5 hours under nitrogen, then poured into a mixture of 500 ml. of ether, 5 ml. of acetic acid and 1.1 of iced water. The organic products are extracted with 3 x 300 ml. of ether. The ether solutions are combined and washed with a large quantity of water, and dried over sodium sulfate. The solution is filtered, evaporated to near dryness and the residue charged onto a 300 g. alumina column. The crude benzyl-(1-benzoyl-4-trifluoromethyl-3-indolyl)acetate is eluted with ether-petroleum ether (5–50% v./v.).

(C) 0.02 mole of the ester obtained in part B is added to 50 ml. of ethyl acetate containing a drop of acetic acid and is reduced catalytically at room temperature in the presence of palladium on charcoal catalyst. Upon completion of the reduction, the catalyst is removed by filtration and the filtrate evaporated to yield 1-benzoyl-4-trifluoromethyl-3-indolyl acetic acid.

When the methyl esters described in Examples 41, 42, 43 and 44 are used in the above procedures, the corresponding 1-benzoyl-3-indolyl acetic or 3-indolyl-α-propionic acid derivatives are obtained.

When, in the above procedure, p-chlorobenzoylchloride, p-methylthiobenzoylchloride, p-methoxybenzoyl chloride, or p-benzyloxybenzoyl chloride are used in place of the benzoyl chloride, the corresponding 1-substituted benzoyl-3-indolyl acids are obtained.

EXAMPLE 45

*(1-Benzoyl-5-Dimethylamino-4-Trifluoromethyl-3-Indolyl)-Acetic Acid*

A mixture of 10 cc. of glacial acetic acid and 5.0 ml. of a 37% aqueous solution of formaldehyde is added to a solution of 0.01 mole of (1-benzoyl-4-trifluoromethyl-5-nitro-3-indolyl)acetic acid in 150 ml. of distilled dimethoxyethane. This mixture is reduced with Raney nickel at 40 p.s.i. and room temperature. After the theoretical amount of hydrogen has been taken up, the reaction mixture is filtered. The catalyst is washed well with ether. The combined filtrate and ether washings are washed with water, dried over sodium sulfate and evaporated in vacuo to yield (1-benzoyl-5-dimethylamino-4-trifluoromethyl-3-indolyl)acetic acid.

When the 1-aroyl-5-nitro-3-indolyl acid compounds in Example 44 are used in equivalent quantities in place of 1-benzoyl-4-trifluoromethyl-5-nitro - 3 - indolyl acetic acid, in the above procedure, there are obtained the corresponding 1-aroyl-5-dimethylamino derivatives.

EXAMPLE 46

*(1-Benzoyl-5-Hydroxy-4-Trifluoromethyl-3-Indolyl) Acetic Acid*

0.001 mole of 1-benzoyl-5-methoxy-4-trifluoromethyl-3-indolyl acetic acid is added portionwise, with stirring, to 1.5 g. of pyridine hydrochloride at 160–220°. On cooling, the residue is extracted with saturated sodium bicarbonate solution and made neutral with 1.0 N HCl. The solution is then extracted with ether and the ether extracts washed well with water and dried over sodium sulfate. The ether solution is concentrated to give 1-benzoyl-5-hydroxy-4-trifluoromethyl-3-indolyl acetic acid.

EXAMPLE 47

*Propyl-(1-Benzoyl-4-Trifluoromethyl-3-Indolyl) Acetate*

A solution of 0.0054 mole of N,N'-dicyclohexylcarbodiimide in 60 ml. of anhydrous tetrahydrofuran is added to a solution of 0.005 mole of 1-benzoyl-4-trifluoromethyl-3-indolyl acetic acid and 0.0054 mole of n-propyl alcohol in 25 ml. of anhydrous tetrahydrofuran. The reaction mixture is shaken vigorously and allowed to stand at room temperature overnight. The dicyclohexylurea is filtered off and 2 ml. of glacial acetic acid is added to the filtrate. The mixture is allowed to stand for one hour. The solution is filtered and about 200 ml. of ether is added to the filtrate. This filtrate is then extracted well with water. The ether solution is dried over sodium sulfate and concentrated in vacuo. The crude material is chromatographed on alumina using ether-petroleum ether (v./v. 5–50%), to obtain propyl 1-benzoyl-4-trifluoromethyl-3-indolyl acetate.

EXAMPLE 48

*2-Fluoro-4-Methylphenylhydrazine*

150 ml. of concentrated HCl is slowly added with stirring to 0.1 mole of 2-fluoro-4-methylaniline. When the temperature of this suspension is at −10°, 0.1 mole of 40% sodium nitrite solution is added. The above addition is carried out over 75 minutes, maintaining the temperature below −5°. A chilled solution of 0.3 mole of stannous chloride in 75 ml. of concentrated hydrochloric acid is then added, dropwise, to this stirred and cooled diazonium solution, over a period of three hours. During this addition the temperature is maintained at 0–5° and after the addition the solution is allowed to remain at 0° for several hours. The mixture is then filtered and the cake washed with cold sodium chloride solution. This solid is then added to 100 ml. of saturated sodium acetate solution, extracted with ether and the ether dried. This crude 2-fluoro-4-methylphenylhydrazine is finally isolated and purified as its hydrochloride.

When equivalent amounts of 3-fluoro-4-methylaniline, 2-fluoro-4-methoxyaniline, 3-fluoro-4-methoxyaniline, 2-fluoro-4-nitroaniline or 3-fluoro-4-nitroaniline is used in the above procedure in place of 2-fluoro-4-methylaniline, there is obtained 3-fluoro-4-methylphenylhydrazine, 2-fluoro-4-methoxyphenylhydrazine, 3-fluoro-4-methoxyphenylhydrazine, 2-fluoro-4-nitrophenylhydrazine or 3-fluoro-4-nitrophenylhydrazine, respectively.

EXAMPLE 49

Methyl-4 or 6-Fluoro-3-Indolyl Acetate 0.07 mole of 3-fluorophenylhydrazine and 0.08 mole of methyl-γ,γ-dimethoxybutyrate are added to 250 ml. of 2 N ethanolic hydrogen chloride and the mixture warmed until reaction sets in. After the initial exothermic reaction stops, the mixture is refluxed for about one-half hour and then concentrated in vacuo to about one-third volume. Four hundred ml. of water are added and the aqueous solution extracted with ether. The ether extracts are washed with sodium bicarbonate solution, water, and then dried over sodium sulfate. The ether solution is concentrated to a small volume in vacuo and chromatographed over 200 g. of acid-washed alumina. The material is eluted with ether-petroleum ether (v./v. 50–60%) and distilled in a short-path distillation apparatus. Both isomers, namely, methyl-4-fluoro-3-indolyl acetate and methyl-6-fluoro-3-indolyl acetate are obtained. The structures of these two isomers are differentiated by means of nuclear magnetic resonance spectroscopy.

When an equivalent amount of 3-fluoro-4-methylphenylhydrazine, 3-fluoro-4-methoxyphenylhydrazine, or 3-fluoro-4-nitrophenylhydrazine is employed in place of 3-fluorophenylhydrazine, there is obtained both isomers of each, namely methyl-(4-fluoro-5-methyl-3-indolyl)acetate, methyl-(6-fluoro-5-methyl-3-indolyl)acetate; methyl-(4-fluoro-5-methoxy-3-indolyl)acetate; methyl-(6-fluoro-5-methoxy-3-indolyl)acetate; or methyl-(4-fluoro-5-nitro-3-indolyl)acetate, methyl-(6-fluoro-5-nitro-3-indolyl)acetate, respectively.

Similarly, when an equivalent amount of 2-fluorophenylhydrazine, 2-fluoro-4-methylphenylhydrazine, 2-fluoro-4-methoxyphenylhydrazine, or 2-fluoro-4-nitrophenylhydrazine is employed in place of 3-fluorophenylhydrazine, there is obtained methyl-(7-fluoro-3-indolyl)acetate, methyl-(7-fluoro-5-methyl-3-indolyl)acetate, methyl-(7-fluoro-5-methoxy-3-indolyl)acetate, or methyl-(7-fluoro-5-nitro-3-indolyl)acetate, respectively.

EXAMPLE 50

Methyl α[4 or 6-Fluoro-3-Indolyl]Propionate

When the procedure of Example 49 is followed, using methyl-γ,γ-dimethoxy-α-methyl-butyrate in place of methyl-γ,γ-dimethoxybutyrate, there is obtained two isomers, namely, methyl-α-(4-fluoro-3-indolyl)-propionate and methyl-α-(6-fluoro-3-indolyl)-propionate.

When an equivalent amount of 3-fluoro-4-methylphenylhydrazine, 3-fluoro-4-methoxyphenylhydrazine or 4-nitrophenylhydrazine is employed in place of 3-fluorophenylhydrazine, there is obtained both isomers of each, namely, methyl-α-(4-fluoro-5-methyl-3-indolyl)-propionate, methyl-α-(6-fluoro-5-methyl-3-indolyl)-propionate; methyl-α-(4-fluoro-5-methoxy-3-indolyl)-propionate, methyl-α-(6-fluoro-5-methoxy-3-indolyl)-propionate; or methyl-α-(4-fluoro-5-nitro-3-indolyl)-propionate, methyl-α-6-fluoro-5-nitro-3-indolyl)-propionate, respectively.

Similarly, when an equivalent amount of 2-fluorophenylhydrazine, 2-fluoro-4-methylphenylhydrazine, 2-fluoro-4-methoxyphenylhydrazine, or 2-fluoro-4-nitrophenylhydrazine is employed in place of 3-fluorophenylhydrazine, there is obtained methyl-α-(7-fluoro-3-indolyl)-propionate, methyl-α-(7-fluoro-5-methyl-3-indolyl)-propionate, methyl-α-(7-fluoro-5-methoxy-3-indolyl)-propionate or methyl-α-(7-fluoro-5-nitro-3-indolyl)-propionate, respectively.

EXAMPLE 51

Methyl-4 or 6-Fluoro-2-Methyl-3-Indolyl-Acetates

When the procedure of Example 49 is followed, using methyl levulinate in place of methyl-γ,γ-dimethoxybutyrate, there is obtained two isomers, namely, methyl-(4-fluoro-2-methyl-3-indolyl)-acetate and methyl-(6-fluoro-2-methyl-3-indolyl)-acetate.

When an equivalent amount of 3-fluoro-4-methylphenylhydrazine, 3-fluoro-4-methoxyphenylhydrazine, or 3-fluoro-4-nitrophenylhydrazine is employed in place of 3-fluorophenylhydrazine, there is obtained both isomers of each, namely, methyl-(2,5-dimethyl-4-fluoro-3-indolyl)-acetate and methyl-(2,5-dimethyl-6-fluoro-3-indolyl)-acetate; methyl-(4-fluoro-5-methoxy-2-methyl-3-indolyl)-acetate, methyl-(6-fluoro-5-methoxy-2-methyl-3-indolyl)-acetate; or methyl-(4-fluoro-2-methyl-5-nitro-3-indolyl)-acetate, methyl-(6-fluoro-2-methyl-5-nitro-3-indolyl)-acetate, respectively.

Similarly, when an equivalent amount of 2-fluorophenylhydrazine, 2-fluoro-4-methylphenylhydrazine, 2-fluoro-4-methoxyphenylhydrazine, or 2-fluoro-4-nitrophenylhydrazine is employed in place of 3-fluorophenylhydrazine, there is obtained methyl-(7-fluoro-2-methyl-3-indolyl)-acetate, methyl-(2,5-dimethyl-7-fluoro-3-indolyl)-acetate, methyl-(7-fluoro-5-methoxy-2-methyl-3-indolyl)-acetate, or methyl-(7-fluoro-2-methyl-5-nitro-3-indolyl)-acetate, respectively.

When the procedure of Example 49 is followed using methyl-α-methyl levulinate in place of methyl-γ,γ-dimethoxybutyrate, there is obtained two isomers, namely, methyl-α-(4-fluoro-2-methyl-3-indolyl)-propionate and methyl-α-(6-fluoro-2-methyl-3-indolyl)-propionate.

When an equivalent amount of 3-fluoro-4-methylphenylhydrazine, 3-fluoro-4-methoxyphenylhydrazine, or 3-fluoro-4-nitrophenylhydrazine is employed in place of 3-fluorophenylhydrazine, there is obtained both isomers of each, namely, methyl-α-(2,5-dimethyl-4-fluoro-3-indolyl)-propionate, methyl-α-(2,5-dimethyl-6-fluoro-3-indolyl)-propionate; methyl-α-(4-fluoro-5-methoxy-2-methyl-3-indolyl)-propionate, methyl-α-(6-fluoro-5-methoxy-2-methyl-3-indolyl)-propionate; or methyl-α-(4-fluoro-2-methyl-5-nitro-3-indolyl)-propionate, methyl-α-(6-fluoro-2-methyl-5-nitro-3-indolyl)-propionate, respectively.

In addition, when an equivalent amount of 2-fluorophenylhydrazine, 2-fluoro-4-methylphenylhydrazine, 2-fluoro-4-methylphenylhydrazine, or 2-fluoro-4-nitrophenylhydrazine is employed in place of 3-fluorophenylhydrazine, there is obtained methyl-α-(7-fluoro-2-methyl-3-indolyl)-propionate, methyl-α-(2,5-dimethyl-7-fluoro-3-indolyl)-propionate, methyl-α-(7-fluoro-5-methoxy-2-methyl-3-indolyl)-propionate, or methyl-α-(7-fluoro-2-methyl-5-nitro-3-indolyl)-propionate, respectively.

EXAMPLE 52

(1-Benzoyl-4-Fluoro-3-Indolyl)-Acetic Acid (A) A solution of 0.05 of a mole of methyl-(4-fluoro- 3-indolyl)-acetate and 0.01 of a mole of sodium in 60 ml. of benzyl alcohol is slowly fractionated over a period of 4½ hours through a Vigreux column to remove methanol. The excess benzyl alcohol is then removed by distillation at 60° C. (2.5 mm.) to give a residue of benzyl-(4-fluoro-3-indolyl)-acetate.

(B) A suspension of 0.046 m. of 50% sodium hydride-mineral oil in 250 ml. of dimethylformamide is stirred for 20 minutes under nitrogen with ice-cooling. Then 0.035 m. of the benzyl ester obtained above is added and the mixture stirred for 20 minutes. To the above mixture, 0.046 m. of benzoyl chloride in 50 ml. of dimethylformamide is added dropwise over a period of 30 minutes. The mixture is stirred in an ice-bath for 5 hours under nitrogen. It is then poured into a mixture of 500 ml. of ether, 5 ml. of acetic acid and 1 l. of iced water. The organic products are extracted with 3 x 300 ml. of ether. The ether solutions are combined and washed with a large quantity of water, and dried over sodium sulfate. The solution is filtered, evaporated to near dryness and the residue charged onto a 300 g. alumina column. The crude benzyl - (1-benzoyl-4-fluoro-3-indolyl) - acetate is eluted with ether-petroleum ether (5–50% v./v.).

(C) 0.02 of a mole of the ester obtained in part B is added to 50 ml. of ethyl acetate containing a drop of acetic acid and is reduced catalytically at room temperature in the presence of palladium on charcoal catalyst. Upon completion of the reduction, the catalyst is removed by filtration and the filtrate evaporated to yield (1-benzoyl-4-fluoro-3-indolyl)-acetic acid.

EXAMPLE 53

(A) *(6-methoxy-3-indolyl) - acetic anhydride.*—0.049 mole of dicyclohexylcarbodiimide is dissolved in a solution of 0.10 mole of 6-methoxy-3-indolyl acetic acid in 200 ml. tetrahydrofuran and allowed to stand at room temperature for 2 hours. The precipitated urea is removed by filtration and the filtrate is evaporated in vacuo to a residue and flushed with Skellysolve B. The residual oily anhydride obtained is used without purification in the next step.

(B) *(t-Butyl-6-methoxy-3-indolyl)-acetate.*—25 mls. of t-butyl alcohol and 0.3 gm. of fused zinc chloride are added to the anhydride from part A. The solution is refluxed for 16 hours and the excess alcohol is removed in vacuo. The residue is then dissolved in ether and washed several times with saturated salt solution. The ether extract is dried over magnesium sulfate and the solution treated with charcoal. The ether solution is then evaporated and flushed several times with Skellysolve B for complete removal of the alcohol. This residual oily ester is used without purification in the next step.

(C) *(t - Butyl - 1 - p - chlorobenzoyl - 6 - methoxy - 3-indolyl)-acetate.*—.065 mole of the crude ester, as obtained in step B, is added to 450 mls. of dimethylformamide and cooled to 4° in an ice bath. .098 mole of a 50% suspension of sodium hydride is added portionwise to this stirred solution. After 15 minutes, 0.085 mole of p-chlorobenzoyl chloride is added over a 10 minute interval. This mixture is then stirred for 9 hours, without replenishing the ice bath. At this time, the mixture is poured into 1 liter of 5% acetic acid, extracted with a mixture of ether and benzene and washed thoroughly with water, sodium bicarbonate solution and a saturated salt solution. The ether extract is dried over magnesium sulfate, treated with charcoal and evaporated to a residue. The crude product, thus obtained, is chromatographed on 600 gms. of acid-washed alumina using a mixture of (v./v. 5–50%) ether-petroleum ether as eluent.

(D) *1-p-chlorobenzoyl - 6 - methoxy - 3 - indolyl acetic acid.*—A mixture of 1.0 g. of the ester obtained in step C and 0.1 g. powdered porous plate is heated, with stirring, in an oil bath at 210° C. under nitrogen for 2 hours. The product is allowed to cool under nitrogen, then dissolved in benzene and ether, filtered and extracted with sodium bicarbonate solution. The aqueous solution is filtered by suction to remove ether, neutralized with acetic acid, then acidified weakly with dilute hydrochloric acid. The crude product is then recrystallized from aqueous ethanol and dried in vacuo.

(E) *1-p-chlorobenzoyl - 7 - methoxy - 3 - indolyl acetic acid.*—When the procedure of Parts A, B, C and D is used, starting with 7-methoxy-3-indolyl acetic acid instead of the 6-methoxy isomer, there is obtained 1-p-chlorobenzoyl-7-methoxy-3-indolyl acetic acid.

EXAMPLE 54

*1-p-Chlorobenzoyl-5,7-Dimethoxy-3-Indolyl Acetic Acid*

(A) *5,7-dimethoxygramine.*—A solution of 0.032 mole of 5,7 dimethoxyindole in 40 mls. of dioxane is added dropwise, over a period of 30 minutes, to an ice-cooled, stirred mixture of 40 mls. of dioxane, 40 mls. of acetic acid, 3.2 mls. of 36% aqueous formaldehyde and 8.8 mls. of 25% aqueous dimethylamine. The clear solution is stirred and cooled for two hours and then allowed to warm up to room temperature over night. To this solution is added 500 mls. of water. The turbid mixture is then treated with charcoal and filtered through a silicaceous filter aid. The clear filtrate is made alkaline with 400 mls. of dilute sodium hydroxide solution, and placed in a refrigerator, to cool. This mixture is then filtered and the solid gramine is washed with water and dried.

(B) *5,7-dimethoxy-indolyl-3-acetonitrile.*—0.106 mole of the gramine obtained in A is added to 420 mls. of methyl iodide, with vigorous stirring, over a period of 20 minutes. The reaction mixture is then allowed to remain at 5° for 15 hours. The solution is filtered and the iodine metholate cake is dried at 50°. This solid is dissolved in a solution of 60 gms. of sodium cyanide in 1 liter of water and warmed for 2 hours at 80°. The desired product is extracted with chloroform which is then evaporated to give a crude oily product. The oil is then dissolved in 250 mls. of ether, filtered and the filtrate concentrated. This concentrate is then diluted with petroleum ether, at which point the 5,7-dimethoxy-indolyl-3-acetonitrile precipitates. The mixture is then filtered and the cake dried.

(C) *5,7-dimethoxy-indolyl-3-acetic acid.*—0.08 mole of the nitrile obtained from B is added to a solution of 140 mls. of alcohol, 100 ml. of water and 4.3 gms. of potassium hydroxide and refluxed for 15 hours. The mixture is brought to room temperature and 60 mls. of glacial acetic acid is added. The solution is then filtered through a talc filter and the filtrate diluted with 500 mls. of water. The precipitated 5,7-dimethoxy-indolyl-3-acetic acid is then filtered and dried.

(D) *1-p-chlorobenzoyl-5,7-dimethoxy-3-indolyl acetic acid.*—The procedure of Example 53A, 53B, 53C and 53D is followed using the product of part C of this example in place of the 6-methoxy-3-indolyl acetic acid, to produce 1-p-chlorobenzoyl-5,7-dimethoxy-3-indolyl acetic acid. When 5,6-dimethoxy-3-indolyl acetic acid is used in place of 6-methoxy-3-indolyl acetic acid in the above procedure, there is obtained 1-p-chlorobenzoyl-5,6-dimethoxy-3-indolyl acetic acid.

When 5,6-methylenedioxyindole or 2-methyl-6-methoxyindole is used in place of 5,7-dimethoxyindole in the procedure of Parts A, B and C, there is obtained 5,6-methylenedioxy-3-indolyl acetic acid, which, where used in the procedure of Part D gives 1-p-chlorobenzoyl-5,6-methylenedioxy-3-indolyl acetic acid or 1-p-chlorobenzoyl-2-methyl-6-methoxy-3-indolyl acetic acid.

EXAMPLE 55

*Methyl 4-Benzyloxy-3-Indolyl Acetate*

(A) *4-benzyloxy-3-indolyl acetonitrile.*—The procedure of Example 54A and 54B is followed, using 4-benzyloxyindole in place of the 5,7-dimethoxyindole, to give 4-benzyloxy-3-indolyl acetonitrile.

(B) *Methyl 2(4-benzyloxy-indolyl-3)acetate.*—A mixture of 0.1 mole of (4-benzyloxy-indolyl-3)-acetonitrile in 150 ml. methanol, containing 30 grams dry hydrogen chloride, is refluxed for 2 hours. The reaction mixture is taken to dryness and the residue distributed between 10% sodium bicarbonate solution and chloroform. The chloroform layer is dried with anhydrous sodium sulfate and taken to dryness in vacuo. The residue is reasonably pure ester.

Similarly, when 7-benzyloxy-3-indolyl acetonitrile is used instead of the 4-isomer, there is obtained methyl 7-benzyloxyl-3-indolyl acetate. When 5-benzyloxy indole and 6-benzyloxy indole are used in the procedure of part A and B of this example, there are produced methyl 5-benzyloxy-3-indolyl acetate and methyl 6-benzyloxy-3-indolyl acetate.

EXAMPLE 56

*1-p-Chlorobenzoyl-4-Methoxy-3-Indolyl Acetic Acid*

(A) *Methyl 4-hydroxy-3-indolyl acetate.*—A solution of methyl 4-benzyloxy-3-indolyl acetate (4.0 g.) in 150 ml. methanol is shaken with 3 g. palladium on charcoal and hydrogen until the hydrogen uptake ceases. The catalyst is filtered and the filtrate is taken to dryness in vacuo.

(B) *Methyl 4-methoxy-3-indolyl acetate.*—A solution of methyl 4-hydroxy-3-indolyl acetate (10.5 gms., 0.065 m.) in 96 ml. 10% sodium hydroxide is stirred and treated with 7.5 ml. dimethyl sulfate. After stirring for several hours, the crude product is extracted with ether, washed with water and dried over sodium sulfate. The ether solution is evaporated in vacuo and the residue is chromatographed on 200 g. of acid-washed alumina using a mixture of ether-petroleum ether (v./v. 25–50%) as the eluent.

(C) *4-methoxy-3-indolyl acetic acid.*—A solution of methyl 4-methoxy-3-indolyl acetate in excess 2 N absolute ethanolic potassium hydroxide is allowed to stand overnight, diluted with water and extracted with ether. The aqueous layer is acidified. The precipitate is collected and recrystallized from aqueous ethanol.

(D) *1 - p - chlorobenzoyl - 4 - methoxy - 3 - indolyl acetic acid.*—The procedure of Examples 53A, 53B, 53C and 53D is followed using the product of part C in place of 6-methoxy-3-indolyl acetic acid, to produce 1-p-chlorobenzoyl-4-methoxy-3-indolyl acetic acid.

EXAMPLE 57

*1-p-Chlorobenzoyl-5-Chloro-6-Methoxy-3-Indolyl Acetic Acid*

(A) *5-chloro-6-methoxy-3-indolyl acetic acid.*—When 5-chloro-6-methoxy-3-indolylacetonitrile is used in place of 5,7-dimethoxy-indolyl-3-acetonitrile, in the procedure of Example 54C, there is obtained 5-chloro-6-methoxy-3-indolyl acetic acid.

(B) *1 - p - chlorobenzoyl - 5 - chloro - 6 - methoxy-3-indolyl acetic acid.*—When the procedures of Examples 53A, 53B, 53C and 53D are followed, using 5-chloro-6-methoxy-3-indolyl acetic acid as the starting material, there is obtained 1-p-chlorobenzoyl-5-chloro-6-methoxy-3-indolyl acetic acid.

(C) *1 - p - chlorobenzoyl - 2 - methyl - 7 - methoxy-3-indolyl acetic acid.*—When 2-methyl-7-methoxyindole is used in place of 5,7-dimethoxyindole in the procedures of Examples 54A, 54B, and 54C and the product is used in the procedures of Examples 53A, 53B, 53C and 53D, there is obtained 1-p-chlorobenzoyl-2-methyl-7-methoxy-3-indolyl acetic acid.

EXAMPLE 58

*1-p-Chlorobenzoyl-2-Methyl-4-Methoxy-3-Indolyl Acetic Acid*

(A) 2 - methyl - 4 - methoxyindole. — (1) *6 - methoxy-2-nitrobenzoyl chloride.*—0.046 mole of 6-methoxy-2-nitrobenzoic acid is added to 60 mls. of redistilled thionyl chloride and refluxed for 2 hours. The excess reagent is removed under reduced pressure, maintaining the temperature below 40°. The residue is washed with benzene and then removed under reduced pressure. This residue is placed over sodium hydroxide, in vacuo overnight.

(2) *Diazomethyl - 6 - methoxy - 2 - nitrophenylketone.*—A solution of .044 mole of the 6-methoxy-2-nitrobenzoyl chloride obtained from (1) in 30 mls. of dioxane is added to a solution of 50 mls. of diazomethane in 200 ml. of ether, with agitation at 0°. The reaction mixture is allowed to remain overnight at room temperature. The solvent is then removed under reduced pressure to yield a residue containing the ketone. The 6-methoxy-2-nitro-phenyl diazomethyl ketone is crystallized from this residue using dioxane.

(3) *6-methoxy-2-nitrophenylacetic acid.*—A solution of .044 mole of the diazoketone obtained in (2) in 75 mls. of dioxane, is added over a period of 20 minutes to a freshly prepared solution of 4.0 gms. of silver oxide, 3.0 gms. of sodium thiosulfate and 5.0 gms. of sodium carbonate in 150 mls. of distilled water. The temperature of the reaction mixture is maintained at 50–60° during the addition and for an additional hour. At this point, the mixture is brought to a temperature of 90–95° for ½ hour. The mixture is then filtered and the filtrate is diluted with 200 mls. of water, acidified with dilute nitric acid and extracted with chloroform (3 × 200 mls.). The combined chloroform extract is washed with 50 mls. of water and dried over sodium sulfate. The chloroform is then removed and the residue extracted with boiling water (2 × 100 mls.). Concentration of the water solution, followed by cooling, precipitates the 6-methoxy-2-nitrophenyl acetic acid.

(4) *Ethyl-6-methoxy-2-nitrophenylacetyl malonate.*—The product from A(3) is used in the procedure of part A(1) to give the corresponding acid chloride. A solution (0.02 mole) of this compound in 25 ml. of ether is gradually added to a refluxing ether solution of ethyl ethoxymagnesiomalonate. Heating is continued until stirring is difficult due to formation of a viscous oil. The cooled mixture is then shaken with dilute $H_2SO_4$ (2.5 g. in 20 ml. $H_2O$) until the oily magnesium complex has dissolved. The ethereal phase is separated, washed with water, and dried over $Na_2SO_4$. Evaporation yields the crude ethyl-6-methoxy-2-nitrophenylacetylmalonate.

(5) *6-methoxy-2-nitrophenylacetone.*—A solution of 5.7 gms. of the product from A(4), 12 mls. of acetic acid, 1.5 mls. of sulfuric acid and 8 mls. of water is refluxed for 6 hours. The cooled solution is made alkaline with 5 N sodium hydroxide and extracted with ether (3 x 50 mls.). The combined ethereal extract is washed with water, dried over sodium sulfate and evaporated to give an oil which rapidly solidifies. Crystallization of this solid from ethanol yields 6-methoxy-2-nitrophenylacetone.

(6) *4-methoxy-2-methylindole.*—1.2 gms. of the product from A(5) is added to a mixture of 100 mls. of ethyl alcohol and 1.0 gm. of Raney nickel. This solution is shaken at room temperature and atmospheric pressure, in hydrogen for ½ hour. The solution is then filtered and the filtrate evaporated under reduced pressure. Crystallization from light petroleum ether yields 4-methoxy-2-methylindole.

(B) *2-methyl-4-methoxy-3-indolyl acetic acid.*—When 4-methoxy-2-methylindole is used in place of 5,7-dimethoxyindole as described in Examples 54A, 54B and 54C, there is obtained 2-methyl-4-methoxy-3-indolyl acetic acid.

(C) *1-p-chlorobenzoyl-2-methyl-4-methoxy - 3 - indolyl*

*acetic acid.*—When the product from 58B is used in place of 6-methoxy-3-indolyl acetic acid as described in Examples 53A, 53B, 53C and 53D, there is obtained 1-p-chlorobenzoyl-2-methyl-4-methoxy-3-indolyl acetic acid.

EXAMPLE 59

*1-p-Chlorobenzoyl-7-Methoxy-5-Methyl - 3 - Indolyl Acetic Acid*

(A) *7-methoxy-5-methylindole.*—0.1 mole of 4-methyl-o-anisidine is added to 0.1. mole of monochloroacetaldehyde and the mixture refluxed for 2 hours. The water formed is distilled off and the residue is heated at 210–220° for an additional hour. This residue is then chromatographed on acid-washed alumina and eluted with ether, petroleum-ether. The eluent is removed under reduced pressure and 7-methoxy-5-methylindole is obtained.

(B) *1-p-chlorobenzoyl-7-methoxy-5-methyl - 3 - indolyl acetic acid.*—The product from part A is used in the procedures of Examples 53A, 53B, 53C and 53D. There is obtained 1-p-chlorobenzoyl-7-methoxy-5-methyl-3-indolyl acetic acid.

(C) *1-p-chlorobenzoyl-5-fluoro-7-methoxy - 3 - indolyl acetic acid.*—The procedures of parts A and B are followed, starting with 4-fluoro-o-anisidine, to give 1-p-chlorobenzoyl-5-fluoro-7-methoxy-3-indolyl acetic acid.

(D) *1 - p - chlorobenzoyl-5-nitro-7-methoxy - 3 - indolyl acetic acid.*—The procedure of parts A and B are followed starting with 4-nitro-o-anisidine, to give 1-p-chlorobenzoyl-5-nitro-7-methoxy-3-indolyl acetic acid. When this is used in the procedure of Example 19, there is produced 1 - p - chlorobenzoyl-5-dimethylamino-7-methoxy-3-indolyl acetic acid.

EXAMPLE 60

*1-p-Chlorobenzoyl-2-Allyl-5-Methoxy - 3 - Indolyl Acetic Acid*

(A) *5-methoxy-2-indolyl acetaldehyde.*—A solution of 5-methoxy-2-indolylacetyl chloride (0.1 mole) in dry tetrahydrofuran is treated with 0.25 mole of lithium aluminum tri-t-butoxy hydride with ice-cooling and stirring. After the initial reaction, the mixture is stirred at room temperature for 4 hours and poured into ice. Excess of acetic acid is added and the product is extracted with ether. The ethereal solution is washed with sodium bicarbontae, dried over sodium sulfate and evaporated to a syrup. Chromatography of the residue on a column of silica gel, using ether-petroleum ether (v./v.) 10–30% as eluent, gives 5-methoxy-2-indolyl acetaldehyde.

(B) *2-allyl-5-methoxy indole.*—A solution of 0.1 mole of the aldehyde and 0.12 mole of methylene triphenylphosphine, prepared in situ from 0.12 mole of methyl triphenylphosphonium iodide and 0.12 mole of n-butyl lithium, in benzene is stirred at room temperature for 4 hours and then at 80° for 1 hour. The solution is washed with 0.5 N hydrochloric acid, water and dried over sodium sulfate. Evaporation of the solvent in vacuo and chromatography of the residue on a column of 300 g. acid-washed alumina, using ether-petroleum ether (v./v.) 0–20% as eluent, gives 2-allyl-5-methoxy indole.

(C) *2-allyl-5-methoxygramine.*—A solution of 0.032 mole of 2-allyl-5-methoxy indole in 40 ml. of dioxane is added dropwise, over 30 minutes, to an ice-cooled stirred mixture of 40 ml. dioxane, 40 ml. acetic acid, 3.2 ml. 36% aqueous formaldehyde and 8.8 ml. 25% aqueous dimethylamine. The clear solution is stirred and cooled for two hours and then allowed to warm to room temperature overnight. To this solution is added 500 ml. of water. The turbid mixture is then treated with charcoal and filtered through a silicaceous filter aid. The clear filtrate is made alkaline with 400 ml. of dilute NaOH solution and cooled in a refrigerator. The mixture is filtered and the solid gramine is washed with water and dried.

(D) *2-allyl-5-methoxy-3-indolyl acetonitrile.*—0.106 mole of the gramine from part C is added to 420 ml. of methyl iodide, with vigorous stirring, over a period of 20 minutes. The reaction mixture is then allowed to remain at 5° for 15 hours. The solution is filtered and the iodine metholate cake is dried at 50° C. The solid is dissolved in a solution of 60 g. NaCN in 1 liter and warmed for 2 hours at 80°. The desired product is extracted with chloroform which is then evaporated to give a crude oily product. The oil is then dissolved in 250 ml. of ether, filtered and the filtrate is concentrated. The concentrate is diluted with petroleum ether, at which point the 2-allyl-5-methoxy-3-indolyl acetonitrile precipitates. The mixture is filtered and the cake dried.

(E) *2-allyl-5-methoxy-3-indolyl acetic acid.*—0.08 mole of 2-allyl-5-methoxy-3-indolyl acetonitrile is added to a mixture of 140 ml. of alcohol, 100 ml. of water and 4.3 g. of KOH. The mixture is refluxed 15 hours and then brought to room temperature. Glacial acetic acid (60 ml.) is added and the solution is filtered through a talc filter. The filtrate is diluted with 500 ml. of water and the precipitated 2-allyl-5-methoxy-3-indolyl acetic acid is separated by filtration and dried.

(F) *1 - p - chlorobenzoyl-2-allyl-5-methoxy-3-indolyl acetic acid.*—The procedure of Examples 53A, 53B, 53C and 53D is followed using the product of part E in place of the 6-methoxy-3-indolyl acetic acid, to produce 1-p-chlorobenzoyl-2-allyl-5-methoxy-3-indolyl acetic acid.

What is claimed is:

1. A compound of the formula

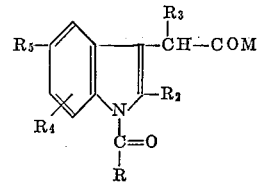

in which
- $R_1$ is selected from the group consisting of benzene, naphthalene, biphenyl and substituted benzene, naphthalene and biphenyl radicals in which said substituent is selected from the group consisting of halogen, lower alkyl, lower alkylthio, lower alkoxy, trifluoromethyl, phenoxy, lower alkyl phenoxy, lower alkoxy phenoxy, halogenophenoxy, trifluoroacetyl, difluoroacetyl, monofluoroacetyl, di-lower alkyl sulfamyl, lower alkanoyl, di-lower alkyl carboxamido, cyano, carb-lower alkoxy, trifluoromethylthio, lower alkyl sulfinyl, lower alkylsulfonyl, benzylthio, lower alkylbenzylthio, lower alkoxybenzylthio, halogenobenzylthio, mercapto, nitro, amino, di-(lower alkyl)amino, lower alkylamino, lower alkanoylamino, hydroxy, lower alkanoyloxy, trifluoroacetoxy, difluoroacetoxy, monofluoroacetoxy, benzyloxy, lower alkylbenzyloxy, lower alkoxybenzyloxy, and halogenobenzyloxy;
- $R_2$ is selected from the group consisting of hydrogen, lower alkenyl and lower alkyl;
- $R_3$ is selected from the group consisting of hydrogen and lower alkyl;
- $R_4$ is selected from the group consisting of hydrogen, lower alkyl, lower alkoxy, fluorine and trifluoromethyl;
- $R_5$ is selected from the group consisting of hydrogen, hydroxy, lower alkyl, lower alkoxy, nitro, amino, lower alkylamino, di(lower alkyl) amino, lower alkanoylamino, lower alkanoyl, lower alkylamino, bis(hydroxy lower alkyl)amino, 1-pyrrolidino, 4-methyl-1-piperizinyl, 4-morpholinyl, cyano, amino lower alkyl, di-lower alkyl amino, lower alkyl, trifluoromethyl, halogen, di(lower alkyl)sulfamyl, benzylthio, lower alkylbenzylthio, lower alkoxybenzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropyl(lower alkoxy) methyloxy, and cyclobutyl(lower alkoxy) methyloxy; and
- M is selected from the group consisting of OH, $NH_2$, benzyloxy, lower alkoxy, OZ where Z is a cation selected from the group consisting of alkali metals, alkaline earth metals, aluminum, iron, magnesium, dimethylammonium morpholium, methyl cyclohexylammonium and glucosammonium and OY where Y represents the structure

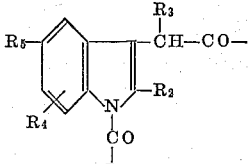

2. A compound of the formula

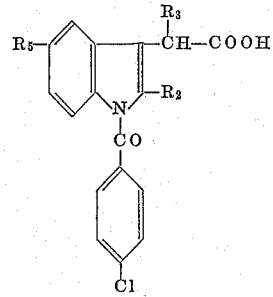

in which $R_2$ and $R_3$ are each lower alkyl and $R_5$ is lower alkoxy.

3. A compound of the formula

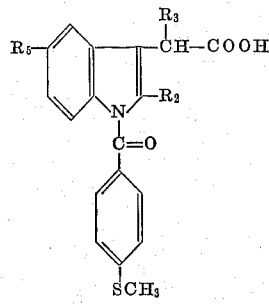

in which $R_2$ and $R_3$ are each lower alkyl and $R_5$ is lower alkoxy.

4. A compound of the formula

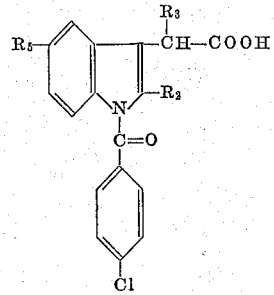

in which $R_2$, $R_3$ and $R_5$ are each lower alkyl.

5. A compound of the formula

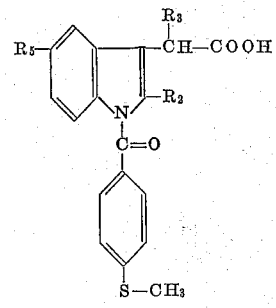

in which $R_2$, $R_3$ and $R_5$ are each lower alkyl.

6. A compound of the formula

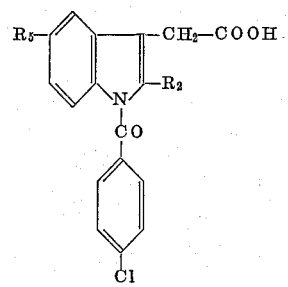

in which $R_2$ is lower alkyl and $R_5$ is lower alkoxy.

7. A compound of the formula

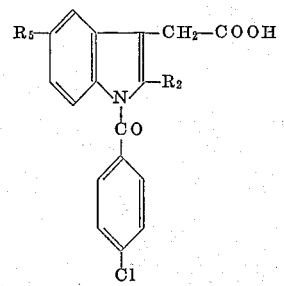

in which $R_2$ is lower alkyl and $R_5$ is di(lower alkyl) amino.

8. A compound of the formula

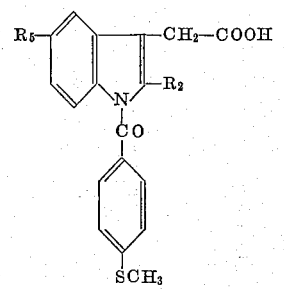

in which $R_2$ is lower alkyl and $R_5$ is lower alkoxy.

9. A compound of the formula

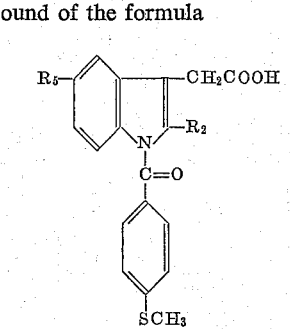

in which $R_2$ is lower alkyl and $R_5$ is di(lower alkyl) amino.

10. α - (1-p-methylthiobenzoyl-2-methyl-5-methoxy-3-indolyl)-propionic acid.

11. α - (1-p-chlorobenzoyl-2-methyl-5-methoxy-3-indolyl)-propionic acid.

12. (1 - p-chlorobenzoyl-2-methyl-5-methoxy-3-indolyl)-acetic acid.

13. α - (1-p-chlorobenzoyl-2-methyl-5-dimethylamino-3-indolyl)-propionic acid.

14. (1 - p-chlorobenzoyl-2-methyl-5-dimethylamino-3-indolyl)-acetic acid.

No references cited.